United States Patent [19]

Murata

[11] Patent Number: 5,586,238
[45] Date of Patent: Dec. 17, 1996

[54] METHOD AND APPARATUS FOR CREATING AN IMAGE

[75] Inventor: Yoshiyuki Murata, Ome, Japan

[73] Assignee: Casio Computer Co., Ltd., Tokyo, Japan

[21] Appl. No.: 326,722

[22] Filed: Oct. 20, 1994

[30] Foreign Application Priority Data

Oct. 29, 1993 [JP] Japan .................................. 5-294601

[51] Int. Cl.$^6$ ................................................ G06T 11/00
[52] U.S. Cl. .................... 395/135; 395/133; 395/141; 395/326
[58] Field of Search ..................... 395/133, 135, 395/141, 145–147, 152, 153, 154, 155, 156, 159, 160, 161; 355/38–40; 358/296

[56] References Cited

U.S. PATENT DOCUMENTS 5,029,312  7/1991  Goenner ..................... 355/38
5,383,027  1/1995  Harvey et al. .............. 358/296

FOREIGN PATENT DOCUMENTS 6-66775   9/1994  Japan .
2275619   9/1994  United Kingdom .

*Primary Examiner*—Almis R. Jankus
*Attorney, Agent, or Firm*—Frishauf, Holtz, Goodman, Langer & Chick

[57] ABSTRACT

An object image creation device which reads related data items such as bar codes or magnetically recorded data items related to an object image printed or recorded on a card or a volume and creates an object image based on the read related data items. The created object image is correctable to be output in accordance with the user's intention. A battle game or a congeniality divination game is playable between a plurality of object images based on the read related data items.

41 Claims, 23 Drawing Sheets

FIG.3

PART PATTERN ROM

| PART NO. (PART NAME) | PART PATTERN NO. | 01 | 02 | 03 | | 49 | 50 |
|---|---|---|---|---|---|---|---|
| 1 | NAME STYLE | | | | | | |
| 2 | FRONT HAIR | | | | | | |
| | | | | | | | |
| 8 | MUSTACHE | | | | | | |
| 9 | BEARD | | | | | | |

FIG.4

BASIC FORM ROM

| NAME NO. / PART PATTERN NO. | HAIR STYLE | FRONT HAIR | EYE-BROWS | | MUS-TACHE | BEARD |
|---|---|---|---|---|---|---|
| 1  FAMOUS PERSON "A" | 01 | 12 | 20 | | 14 | 25 |
| 2  FAMOUS PERSON "B" | 09 | 07 | 11 | | 08 | 07 |
| | | | | | | |
| 50  ANIMAL "Z" | 49 | 49 | 48 | | 45 | 46 |

< FAMOUS PERSON "A" > — 23

22 {
HAIR STYLE : 01
FRONT HAIR : 12
EYE-BROWS : 20
EYES : 13
NOSE : 11
MOUTH : 07
CONTOUR : 06
GLASSES : 10
MUSTACHE : 14
BEARD : 25
}

21A, 21, 19, 20

| DISPLAY REGISTER | | | | | | |
|---|---|---|---|---|---|---|
| INDIVIDUAL'S DATA | | PORTRAIT DATA | | | | |
| NAME | TEL | HAIR STYLE | FORNT HAIR | EYE-BROWS | | BEARD |
| FAMOUS PERSON "A" | 03-xxx-xxxx | 01 | 12 | 20 | | 25 |
| FAMOUS PERSON "B" | 06-xxx-xxxx | 12 | 09 | 13 | | 18 |
| FAMOUS PERSON "C" | — | 01 | 12 | 20 | | 25 |
| ORDINARY PERSON "A'" | 04-xxx-xxxx | 03 | 13 | 20 | | 25 |
| ORDINARY PERSON "B'" | 03-1245-5566 | 05 | 11 | 20 | | 48 |
| ORDINARY PERSON "C'" | 03-5678-9900 | 03 | 13 | 25 | | 33 |

FIG.17A

| PART PATTERN NO. / PART NO. (PART NAME) | 01 | 02 | 03 | | 49 | 50 |
|---|---|---|---|---|---|---|
| 1 EYES (VICTORY) | ⌒⌒ | ⌒⌒ | ◎◎ | | ⌒⌒ | ◦◦ |
| 2 EYES (DEFEAT) | ᴗᴗ | ╱╲ | 👁👁 | | ᴗᴗ | 👁👁 |

FIG.17B

| PART PATTERN NO. / PART NO. (PART NAME) | 01 | 02 | 03 | | 49 | 50 |
|---|---|---|---|---|---|---|
| 1 EYES (HIGH) | ⌒⌒ | ⌒⌒ | ◎◎ | | ⌒⌒ | ⌒⌒ |
| 2 EYES (LOW) | ᴗᴗ | ᴗᴗ | ᴗᴗ | | ᴗᴗ | ᴗᴗ |

| RESULT OF DETERMINATION | MESSAGES |
|---|---|
| VICTORY | I won, wo !! |
| DEFEAT | I lost. Please, pardon me!! |
| DRAW | Mmm ··· |

| SCORE DIFFERENCE | MESSAGES ||
|---|---|---|
| 0~3 | Just congenial !! | What a delight ! |
| 4~15 | That's about night ! | Let's be good neighbors ! |
| 16~29 | Never congenial ! | Let's compete in a battle game ! |

} 24b

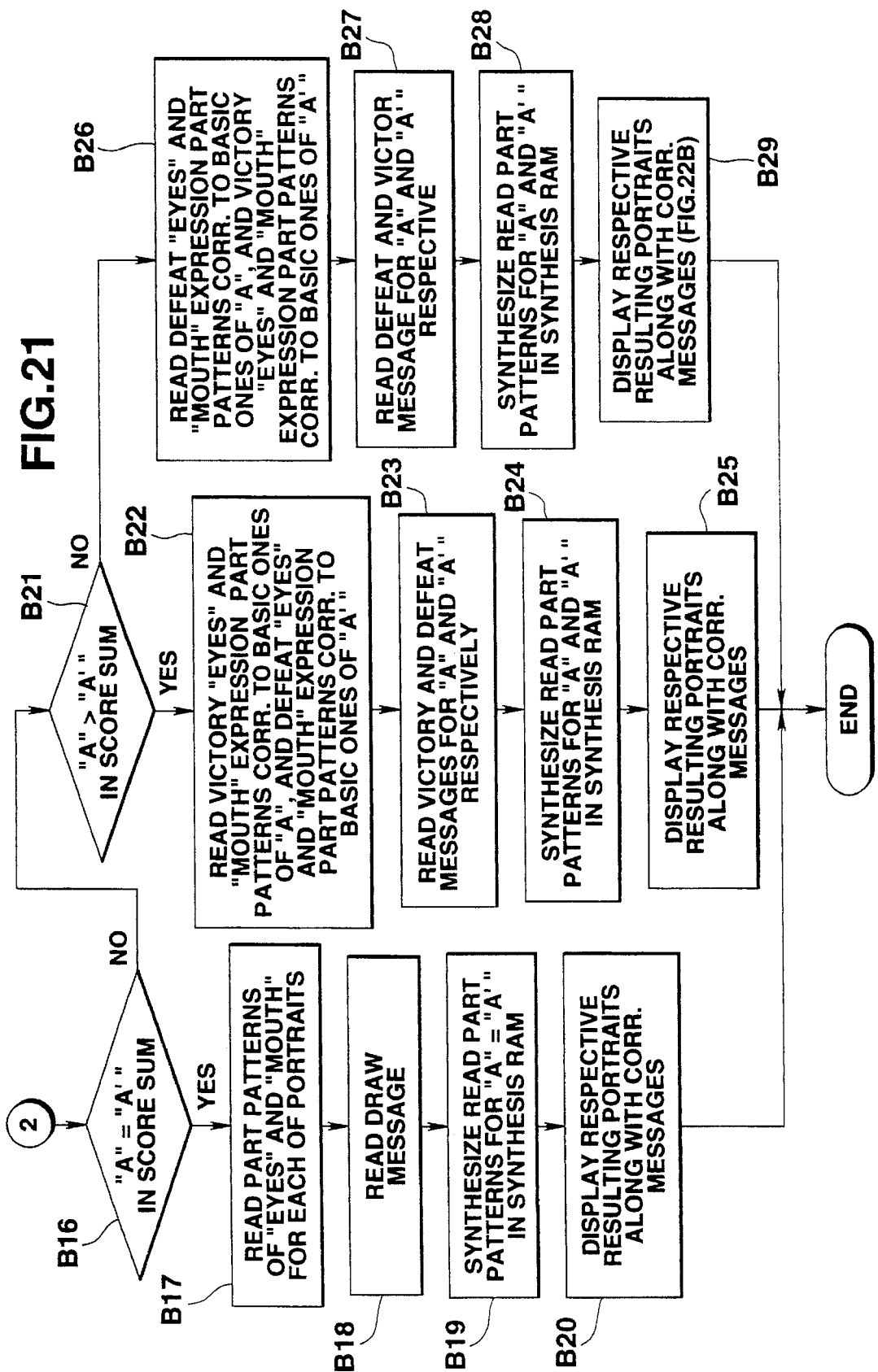

METHOD AND APPARATUS FOR CREATING AN IMAGE

BACKGROUND OF THE INVENTION

The present invention relates to object image creation devices and methods for creating a portrait image and a building image, and object image recording mediums used in the devices.

Recently, object image creation devices are known which store data on a plurality of part images for each of the parts which constitute an object, selects any part image for each part from among the stored part images and combines the selected part images into a person's portrait image or a building image having a respective one of various expressions or shapes.

However, since the number of kinds of the respective part images prepared beforehand for each part is limited, and selection of part images optimal for an object image to be created from the plurality of kinds of part images is difficult, creation of an object image which is the same as, or similar to, a real or a desired object image is very difficult. Further, operation of many keys and a long time is required for the creation of such image.

It is therefore an object of the present invention to provide an object image creation device and method capable of creating an object image which is the same as, or similar to, a real object image or a desired object rapidly and surely in a very simple operation.

It is another object of the present invention to provide a new object recording medium useful for the object image creation device.

It is still another object of the present invention to provide an object image outputting device and method in which a game based on the created object image is can be played.

SUMMARY OF THE INVENTION

In order to achieve those objects, the present invention provides an object image creation device comprising:

an object image printing medium on which an object image and related data items related to the respective part images which constitute the object image are printed;

read means for reading a related data item printed on the printing medium;

storage means in which data items on a plurality of different part images corresponding to each of the parts which constitute an object are stored beforehand for that part; and object image creating means for reading, for each of the parts of the object from the storage means, a data item on a part image corresponding to the related data item read by the read means on the basis of the read related data item, and combining the read data items on the respective part images to create an object image.

In this structure, an object image and related data related to the respective part images which constitute the object image are printed on the object image printing medium. The storage means beforehand stores data on a plurality of different part images for each of the parts of the object. When the read means reads the related data printed on the printing medium, the corresponding part image data for each of the parts is read out from the storage means on the basis of the read related data. The object image creation means combines those read part image data items into an object image, which is then output by the object image outputting means which includes display means or printing means.

BRIEF DESCRIPTION OF THE DRAWINGS

FIG. 3 illustrates the contents of a part pattern ROM;

FIG. 4 illustrates the contents of a basic form ROM;

FIG. 17A shows battle expression patterns, data on which is stored in an expression part pattern ROM;

FIG. 17B shows congeniality divination expression patterns, data on which is stored in the expression part pattern ROM;

FIG. 18 shows battle result messages, data on which is stored in a battle message ROM;

FIG. 19 shows congeniality message stored in a congeniality message ROM;

FIG. 21 is a flowchart indicative of the latter half process of the battle game;

DESCRIPTION OF THE PREFERRED EMBODIMENTS

Embodiments of the present invention will be described below with respect to the accompanying drawings.

[First Embodiment]

Figure 1:
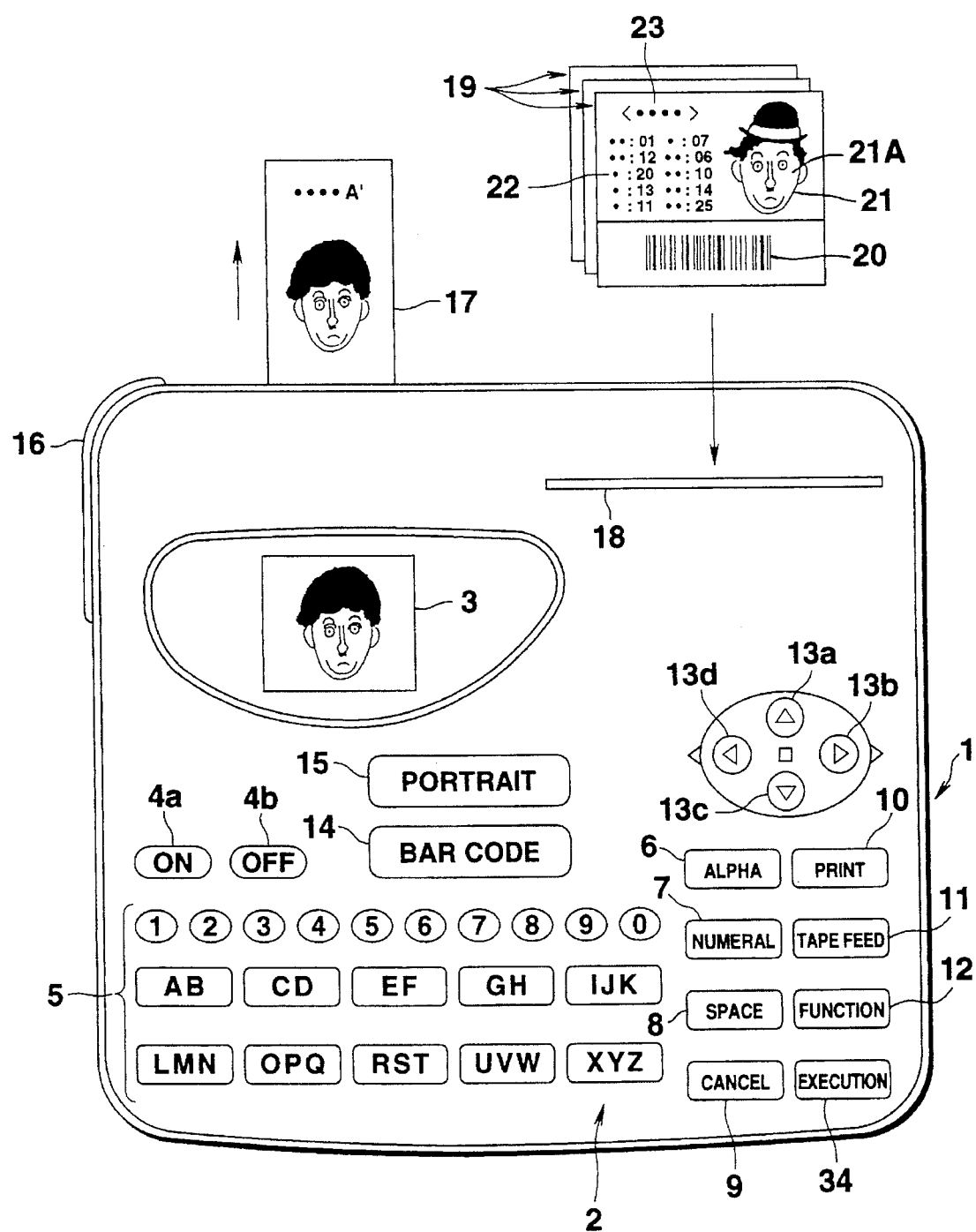
FIG. 1 shows the whole of an object image creation device and an object image recording medium as a first embodiment off the present invention.
Figure 2:
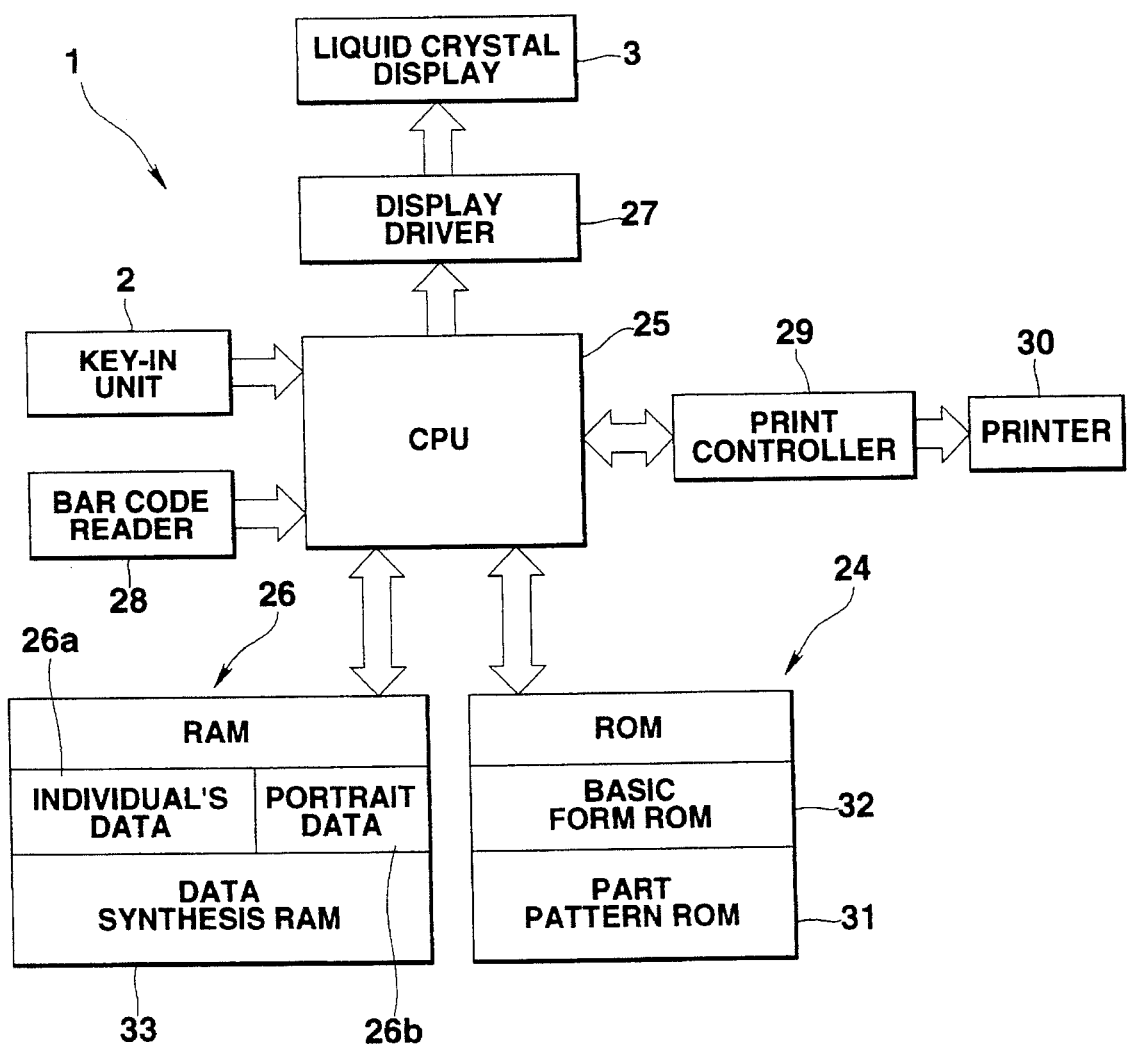
FIG. 2 is a block diagram indicative of a circuit structure used in the object image creation device of FIG. 1.

FIG. 1 shows the whole of an object image creation device and an object image recording medium as a first embodiment of the present invention. FIG. 2 is a block diagram indicative of a circuit structure used in the object image creation device.

In FIG. 1, the object image creation device body 1 is provided with a key-in unit 2 and a liquid crystal display 3 on the front thereof. The key-in unit 2 is provided with an on key 4a and an off key 4b operated to perform an on and off operation of a power supply (not shown); various alphanumeric keys 5 operated to input numerals and alphabetic characters; an alphabetic mode key 6 operated to set an alphabetic character input mode; a numeral mode key 7 operated to set a numeral input mode; a space key 8 operated to input a space; a cancel key 7 operated to cancel the last input data; a print starting key 10 operated to start printing; a tape feed key 11 operated to instruct the tape feed; a function selection key 12 operated to select a function; and a first-a fourth cursor key 13a–13d operated to move a cursor on the liquid crystal display 3, to designate a part, and to select the pattern of a part image.

The key-in unit 2 is provided with a bar code key 14 operated to set a portrait data reading mode, and a portrait creation mode key 15 operated to set a portrait creation mode. The portrait reading mode is set to read data on the respective parts of a portrait image. The portrait creation mode is set when a portrait image is created.

Provided on the left-hand side of the object image creation device body 1 is a tape cutting lever 16 operated manually when a printing tape 17 is cut which is fed out from the inside of the device body 1 by the operation of the print starting key 12.

A portrait card inlet 18 is provided in an upper right-hand portion of the device body 1 such that any one of a plurality of portrait cards 19 selected by the user is inserted into the card inlet 18. The portrait cards 19 include the corresponding object image printing mediums. A bar code 20 is printed on each of the portrait cards 19 to indicate part pattern numbers each indicative of the pattern of a respective one of the part images which constitute a portrait image 21A printed on the portrait card 19 (Each part pattern number is also referred hereinafter to as "portrait data"). Each part pattern number is indicated by numerical data which constitutes related data allocated to that part pattern.

Printed above the bar code 20 are the portrait 21A, portrait data 22 and a portrait's name 23. A portrait area 21 has printed thereon the portrait image 21A composed of a combination of part patterns corresponding to the printed bar codes. In the case of this embodiment, the portrait image 21A is of a famous person "A". The portrait data 22 involves a list of the names of the respective parts of the portrait image and corresponding part pattern numbers (numeral data) indicative of the patterns of the parts. The portrait's name 23 is of the portrait image printed in the area 21 (in this example, the name of the famous person "A").

The structure of an electronic circuit used in the object image creation device of FIG. 2 will be described next. The object image creation device includes a CPU 25 which controls the operations of the respective elements of the electronic circuit on the basis of key operation signals fed by the key-in unit 2 in accordance with the a program stored in a ROM 24, a RAM 26, a display driver 27, a bar code reader 28, and a print controller 29 connected to the CPU 25. The display driver 27 is connected to a liquid crystal display 3 while the print controller 29 is connected to a printer 30.

The ROM 24 includes a part pattern ROM 31 and a basic form ROM 32. The former ROM 31 stores for each of the parts data on a plurality of kinds (50 kinds, in this embodiment) of part images or patterns which constitute a portrait image in the form of a bit map with each part image being identified with a corresponding part pattern number.

For example, as shown in FIG. 3, a storage area 31a for a part "hair style" corresponding to a part number "1" stores data on 50 kinds of different patterns of a hair style for pattern numbers "01"–"50". A storage area 31b for a part "front hair style" corresponding to a part number "2" stores data on 50 kinds of different patterns of a front hair style for part pattern numbers of "01"–"50". Similarly, the following storage area for a part "brows" corresponding to a part number "3" (not shown) to a storage area 31n for a part "beard" corresponding to a part number "9" each store data on 50 kinds of different part patterns for part pattern numbers "01"–"50".

The latter basic form ROM 32 stores for each of 50 portrait images a plurality of sets of part pattern numbers, each set of part pattern numbers indicating the part patterns which constitute a respective one of different basic portrait images set beforehand, for example, as shown in FIG. 4.

For example, a storage area 32a for a famous person "A" indicative of a first basic form for No. "1" in the basic form ROM 32 stores data on part pattern numbers indicative of the respective part patterns which constitute the portrait image of the famous person "A" for the corresponding parts of the portrait image. A storage area 32b for a famous person "B" indicative of a second basic form for No. "2" in the basic ROM 32 stores data on part pattern numbers indicative of the respective part patterns which constitute the portrait image of the famous person "B" for the corresponding parts of the portrait image. Simultaneously, a storage area for another object (not shown) indicative of a third basic form for the next No. (not shown) in the basic ROM 32 to the end storage area 32n for an animal "Z" indicative of a 50th basic form each store data on 50 part pattern numbers, indicative of the respective part patterns which constitute the portrait image of a human being or an animal, for the corresponding parts of the portrait image.

Figures 5, 6:
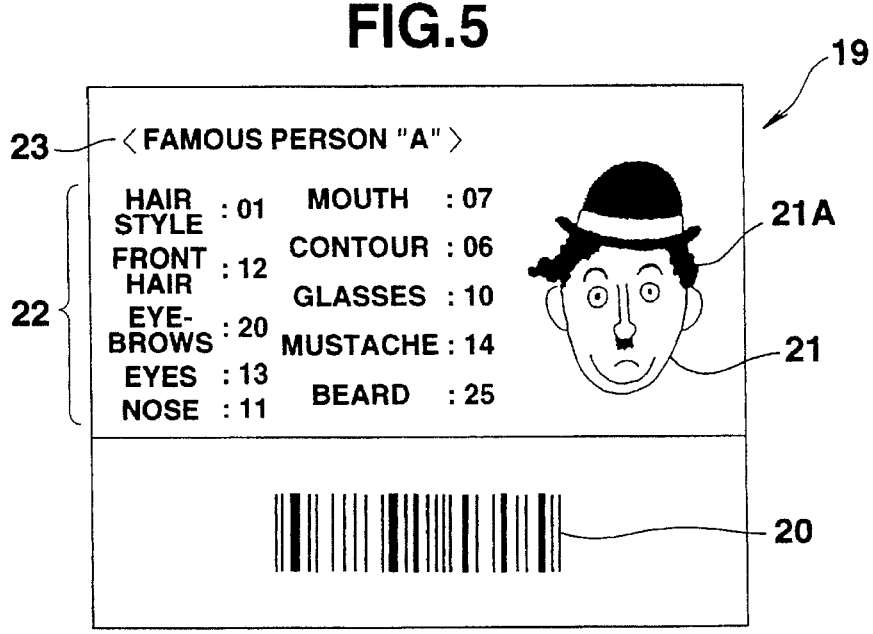
FIG. 5 is a plan view of one example of a portrait card.
FIG. 6 illustrates data stored in a RAM.

As shown in FIG. 6, the RAM 26 is provided with individual's data areas 26a, each of which stores data on a persons' name and his telephone number keyed in by the user, an portrait data areas 26b, each of which stores data on part pattern numbers indicative of the part patterns constituting a portrait image of a famous or ordinary person; and a display register area 26c.

The RAM 26 further includes a data synthesis RAM 33, which temporarily stores data on the respective part patterns read from the part pattern ROM 31 in correspondence to the portrait image data stored in the RAM 26 for synthesis of the respective part patterns. The portrait image including the part patterns synthesized in the data synthesis RAM 33 is stored in the display area 26c and displayed on the display 3.

The print controller 29 converts a portrait image based on the individual's data or portrait image data stored in the RAM 26 to data suitable for printing and causes the printer 30 to print on the basis of the converted data. The printer 30 performs drive and control on a printing tape 17 and an ink ribbon (not shown) in addition to the printing operation.

The bar code reader 28 optically reads the bar code 20 printed at the lower position on the portrait card 19 inserted into the portrait card inlet 18. The bar code 20 read by the reader 28 is converted to portrait data (pattern numbers indicative of the respective parts) corresponding to the portrait image printed on the inserted portrait card 19 by the decoding operation of the bar code by the CPU 25. The portrait data is then stored in the portrait data area 26b of the RAM 26.

The operation of the object image creation device of the first embodiment will be described in accordance with a flowchart of FIG. 7.

Figure 10A:
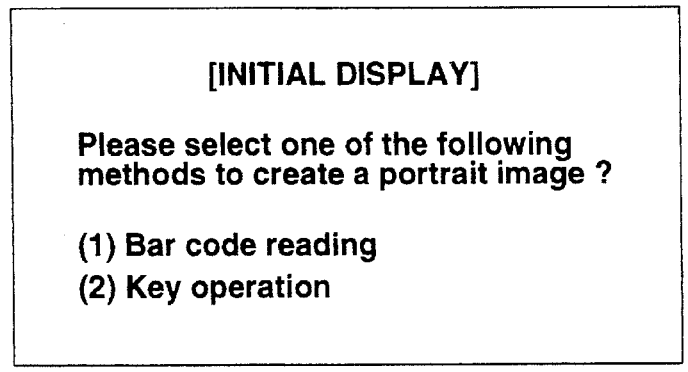
FIGS. 10A–10C show the respective illustrative displays performed by the first embodiment.

When the on key 4a is turned on, the picture of the display 3 is put in an initial display state (step S1). In this state, expressions and messages including "[Initial display]", "Please select one of the following methods to create a portrait image ?", and "(1) Bar code reading", "(2) Cursor key operation" are displayed in the form of a dialogue (FIG. 10A).

At step S2 it is determined whether the bar code key 14 has been operated in accordance with the "(1) Bar code reading". If so, a portrait data read mode is set, in which the message "Please, key individual's data in." is displayed on the display screen on the basis of the message data stored beforehand in the ROM 24. Thus, individual's data (on the name, telephone number) on a portrait image to be created is keyed in at the key-in unit 2. At step S3, when some alphanumeric keys 5 of the key-in unit 2 are determined to have been operated, the keyed-in individual's data is stored in the individual's data area 26a of the RAM 26 (step S4). This embodiment shows storage of data on the name of the famous person "A" in the individual's data area 26a.

When this storage is completed, the message "Please, insert a portrait card" is displayed on the display screen on the basis of the message data stored beforehand in the ROM 24. The portrait image to be created is of the famous person "A", so that the portrait card 19 on which the image of the famous person "A" is printed is inserted into the card inlet 18.

At step S5 a bar code data reading process is performed. In this process, the bar code 20 printed at a lower position on the portrait card 19 inserted into the card inlet 18 is read in an optical data reading manner in the bar code reader 28. When the bar code data has been read, a bar code decoding process is performed by the CPU 25 at step S6 in which the read bar code data is converted to portrait data (part pattern number data) for the respective parts corresponding to the portrait image printed on the portrait card 19. When it is then determined at step S7 that the decoding has been completed, the converted portrait data is stored in the portrait data area 26b of the RAM 26 at step S8. When storage of the portrait data into the RAM 26 is determined to be completed at step S8, a portrait image creation process is performed at the next step S9.

Next, assume that (2) "key operation" is selected on the display screen of FIG. 10A. That is, when it is determined at step S2 that the bar code key 14 has not been operated, and that it is determined at step S10 whether the portrait creation mode key 15 has been operated, the portrait creation mode is set at step S11. In this case, portrait data indicative of a first one of the fifty basic form portrait images, each of which is composed of part pattern images, data on which is stored beforehand in the basic ROM 32, is stored automatically in the RAM 26.

In the present embodiment, the portrait data indicative of the first basic portrait image is for the famous person "A" portrait, data on which is stored in the storage area 32a of the basic form ROM 32, so that the famous person "A" portrait data is stored in the portrait data storage area 26b in the RAM 26. Simultaneously, data on the name of the famous person "A" is read from the basic form ROM 32 and stored in the individual's data area 26a of the RAM 26. When at step S11 storage of the portrait data in the RAM 26 is completed, the portrait image creation process is performed at the next step S9 in accordance with the flowchart of FIG. 8.

In this process, part patterns corresponding to the portrait data stored in the RAM 26 are read for the respective parts from the part pattern ROM 31 on the basis of the portrait data stored in the RAM 26, and synthesized into an image in the data synthesis RAM 33 in the data synthesis process at step S90.

Figure 9:
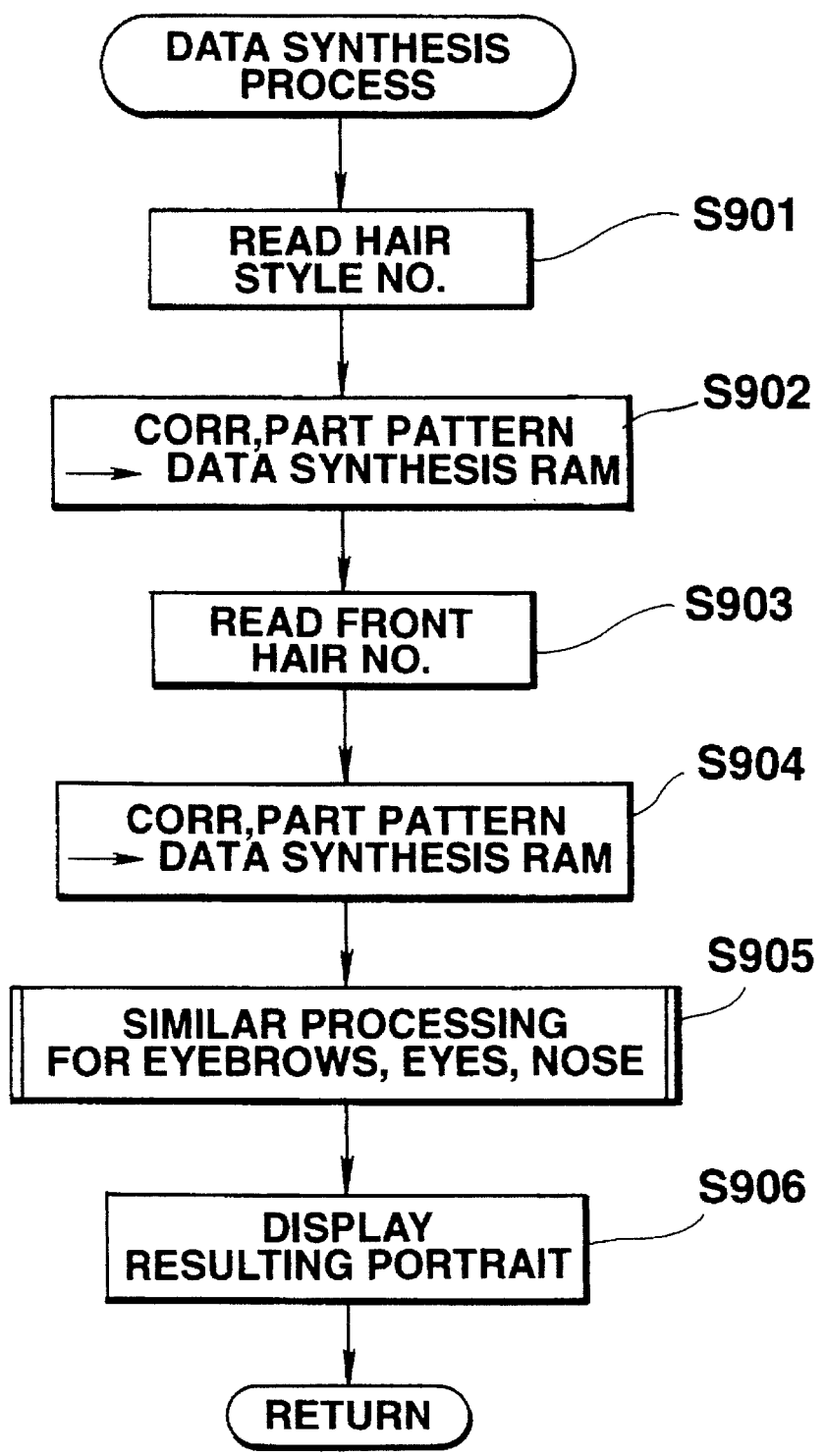
FIG. 9 is a flowchart indicative of a data synthesis process.

This data synthesis process is performed in accordance with a flowchart of FIG. 9. First, that of the part pattern numbers which involve the portrait data stored in the portrait data area 26b of the RAM 26 and which involves the "hair style" having a smallest part number is read (step S901). Data on the part pattern indicated by the read part pattern number is read from the part pattern ROM 31 and stored in the data synthesis RAM 33 (step S902). A part pattern number which involves the "front hair style" having the next smallest part number is then read (step S903). Part pattern data corresponding to the read part pattern number is read from the part pattern ROM 31 and then stored in the data synthesis RAM 33 (step S904).

Figure 10B:
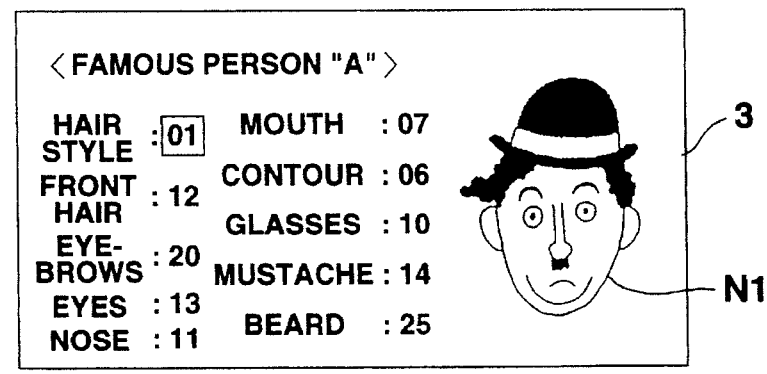

Similar processing is performed for all other parts such as "brows", "eyes", and "nose" (step S905). As a result, at step S906 a portrait image N1 which is the same as the portrait image 21A of the famous person "A" printed on the inserted portrait card 19 is displayed on the display 3 (FIG. 10B). In addition to the portrait image N1, the name of the famous person "A" is displayed on the basis of that name, data on which is stored in the individual's data area 26a of the RAM 26, and the respective part names and the corresponding part pattern numbers are displayed on the basis of the portrait data stored in the portrait data area 26b of the RAM 26.

When it is determined that the portrait image N1 displayed on the display 3 is a desired one to be created, no key operations are performed at the next steps S91–S93 and an execution key 34 is operated at step S94. When it is determined that the execution key 34 is operated, portrait data itself stored currently in the RAM 26 is finally recorded at step S95.

When a portrait image different from the portrait image N1 displayed on the display 3 in the synthesis process at step S90 is to be created, the second cursor key 13b is operated, which leads to processes at steps S91, S96 and S90. Thus, one of the fifty basic form portrait images of part pattern images, data on which is stored beforehand in the basic form ROM 32, is stored in the data synthesis RAM 33 and displayed on the display 3. Thus, the user can select a basic form portrait image, which is expected to be the same as, or similar to, that which the user desires, from among the 50 basic form portrait images. When the user determines that the selected and displayed basic form portrait image is the one which he desires, he operates the execution key 34 at step S93 to record the portrait data corresponding to the basic form portrait image in the portrait data area 26b of the RAM 26 to thereby terminate the portrait creation process.

When the user desires to create a portrait image different from the image N1 displayed on the display 3 by modifying the image N1 in the combining process at step S90, he is required to operate the first cursor key 13a (without operating the second cursor key 13b) (step S92), at which time the current designated part number is changed to another part number (step S97). In the case of this embodiment, the part numbers cover "1" indicative of "hair style" to "9" indicative of "beard", so that the part number is changed to a different one of the part numbers "1"–"9". The different part number is then stored in the appropriate storage area of the RAM 26.

Figure 10C:
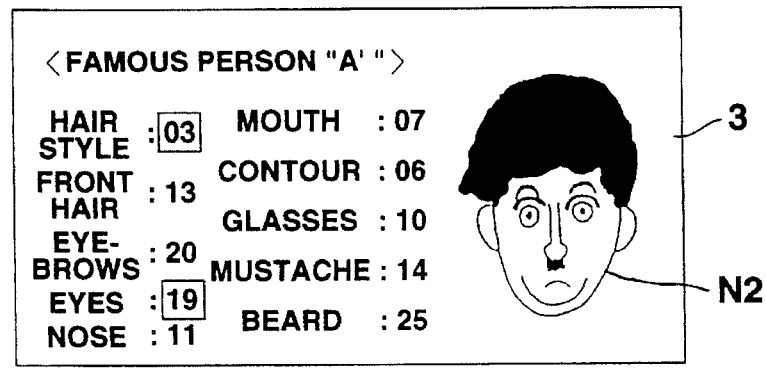

Thereafter, the user operates the fourth cursor key 13d (step S93), at which time the part pattern number is changed to one of the patterns of the new changed part (step S98). In the case of this embodiment, the part pattern numbers are "01"–"50", so that the part pattern number is changed to one of the part pattern numbers "01"–"50", and the corresponding part pattern is read from the part pattern ROM 31 to replace the current displayed part pattern or to be combined with the other part patterns in the data synthesis RAM 33. Thus, a portrait image obtained by the combination of those part patterns is displayed on the display 3. When the replacing part pattern is determined to be not a desired one, the fourth cursor key 13d is again operated to select a part pattern having a different shape until a part pattern having a desired shape is selected, at which time the name of the portrait image, for example, the person "A", is keyed in as individual's data by the key-in unit 2 to be stored in the individual's data area 26a of the RAM 26. The execution key 34 is then operated at step S94 to store data on the current displayed portrait image N2 in the portrait data area 26b of the RAM 26, as shown in FIG. 10C, to thereby terminate the portrait creation process.

Thereafter, when the print starting key 12 is operated, the respective part patterns corresponding to the portrait data recorded in the RAM 26 are read from the part pattern ROM 31 on the basis of those portrait data, and are synthesized and displayed as a portrait image. Thereafter, the print controller 29 operates to drive the printer 30 to print the displayed image along with individual's data stored in the individual's data area 26a of the RAM 26 on the printing tape 17 stored in the device body 1 with the aid of the ink ribbon (not shown).

As described above, when the user inserts a one selected from the portrait cards 19 into the card inlet 18 in the device body 1, the bar code reader 28 reads a bar code printed at the lower position on the card 19, converts the bar code to the corresponding portrait data, and automatically displays on the display 3 the same portrait 21A as is printed on the portrait card 19.

When the print starting key 12 is operated, the portrait 21A is printed on the printing tape 17. Thus, a desired portrait image is obtained rapidly and surely without a complicated key-in operation.

While in the embodiment the bar code 20 printed on the portrait card 19 includes a bar code indicative of the part patterns constituting the portrait image, individual's data (the name of that portrait, for example, the famous person "A"), and a bar code corresponding to the part name or number may be printed. By doing so, the bar codes are read as the individual's data or portrait image data at step S5, so that the key-in operation of the individual's data and part name or number at step S3 of FIG. 7 is omitted. In addition, storage of those data into the individual data area 26a of the RAM 26 at step S4 is omitted.

[Second Embodiment]

Figure 11:
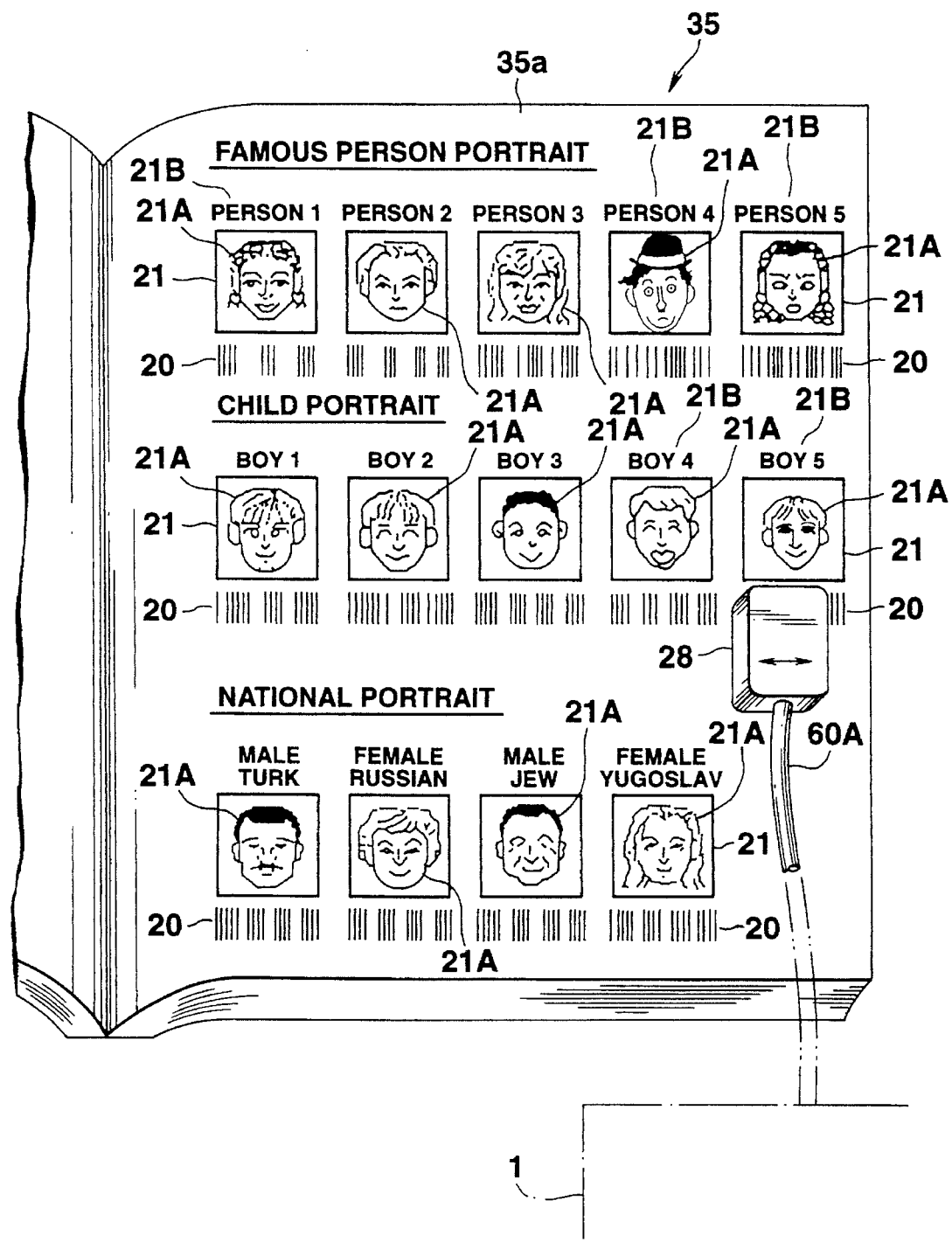
FIG. 11 shows the illustrative use of a second embodiment of the present invention.

FIG. 11 shows the second embodiment of the present invention. In the first embodiment (FIGS. 1–10), a plurality of portrait cards 19 on which the portrait 21 and corresponding bar code 20 are printed is prepared. Any one of the portrait cards 19 is selected and inserted into the card inlet 18 in the device body 1 such that data on the bar code 20 printed on the card 19 is read by the bar code reader 28, and the same portrait image as the portrait image 21 is reproduced and displayed on the display 3 or printed on the printing tape 17 on the basis of the read bar code data.

In contrast, in the second embodiment, a volume 35 is used which has pages 35a, each including thereon sets of portrait areas 21, portrait images 21A printed on the corresponding portrait areas 21, printed names 21B of the portrait images 21A and printed bar codes 20 indicative of the portrait images 21A under the corresponding classifications items.

The device body 1 is the same in structure as that of the first embodiment (FIG. 2) except that the bar code reader 28 is connected through a connection cord 60A to the device body 1.

The user searches a portrait image 21A, which is the same as, or similar to, that to be created, from among the portrait images 21A printed under each of the classified items and traces a bar code 20 printed below the corresponding portrait image 21A with the bar reader 28.

Figure 7:
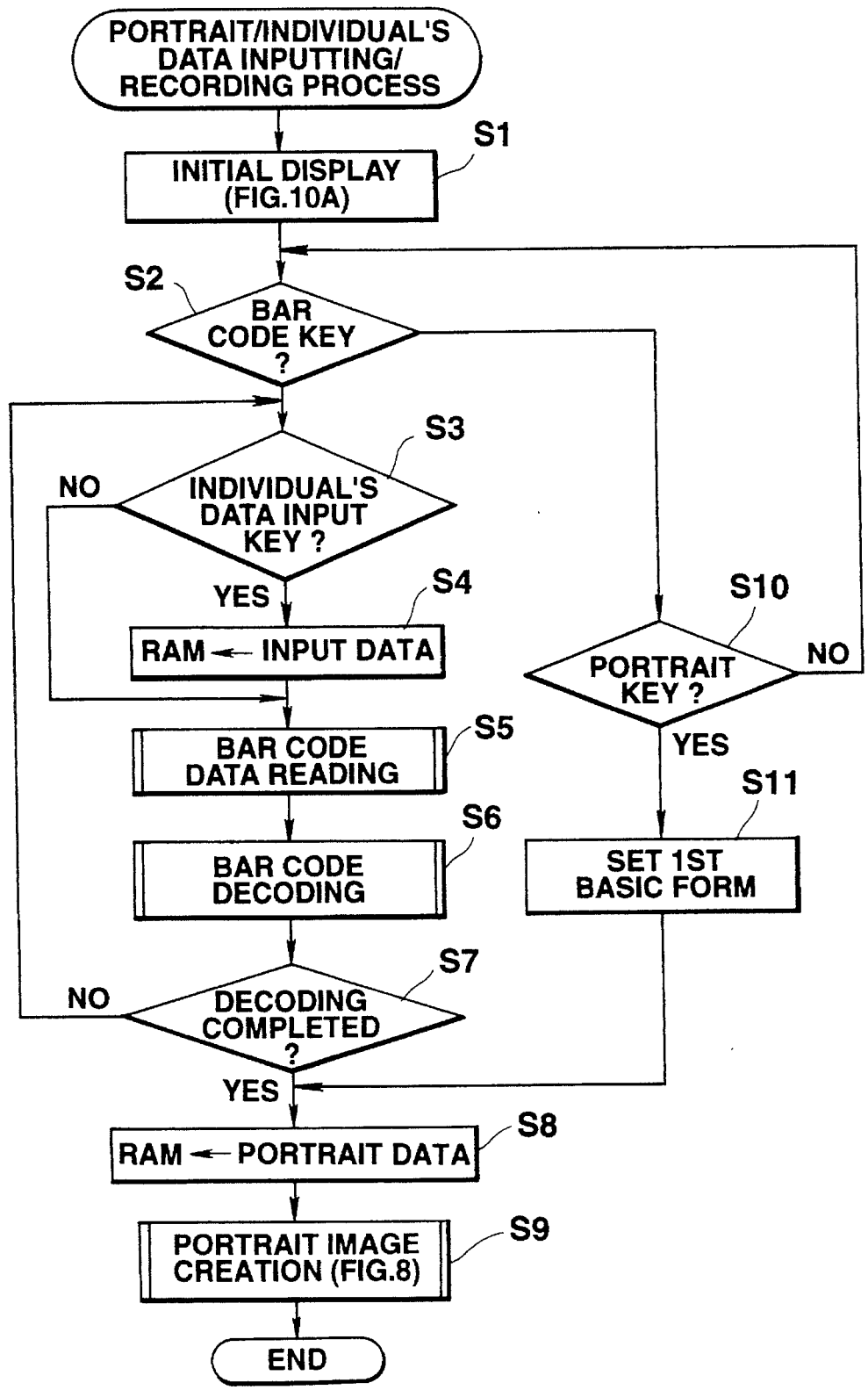
FIG. 7 is a flowchart indicative of the operation of the first embodiment.
Figure 8:
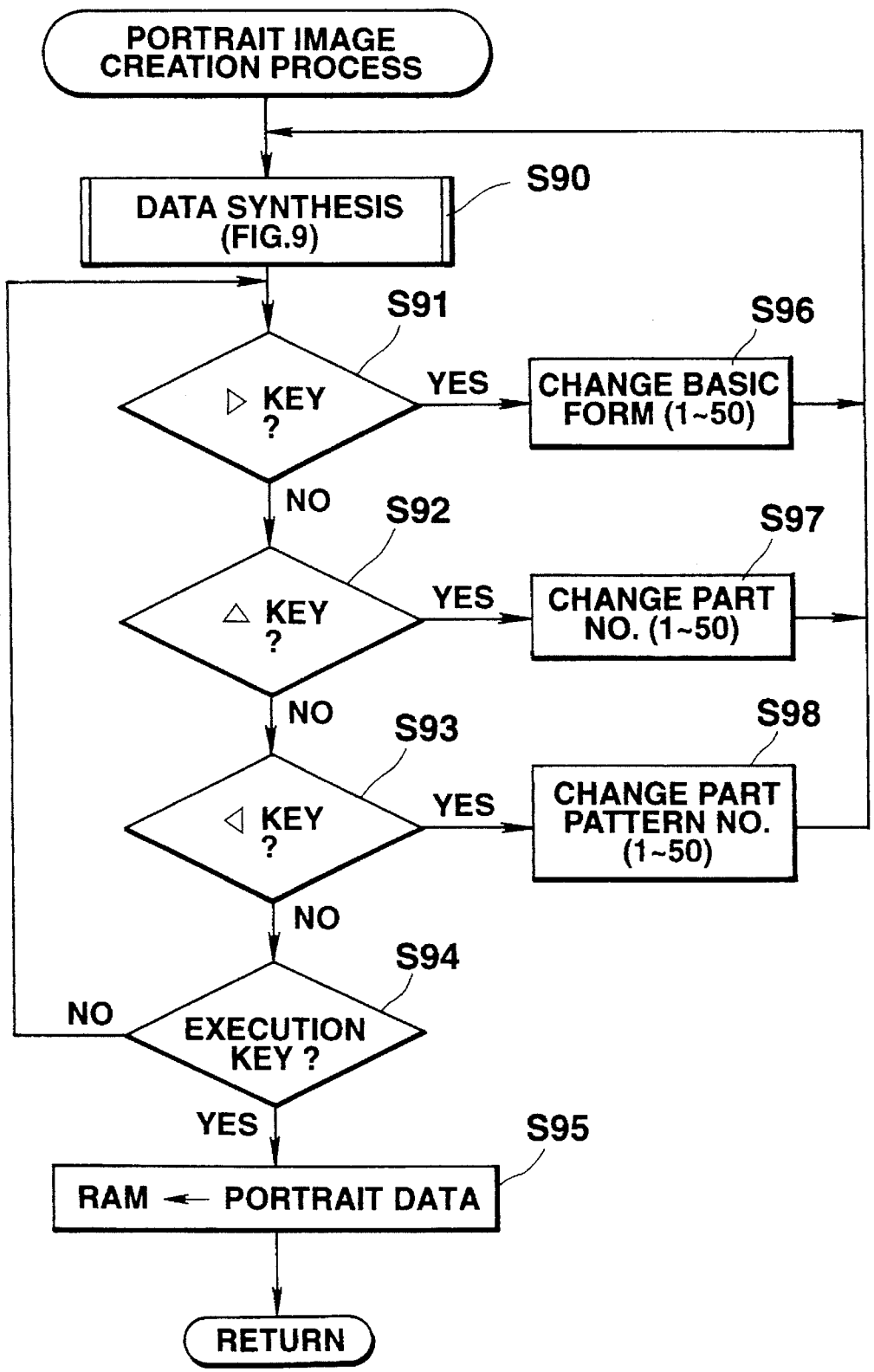
FIG. 8 is a flowchart indicative of a portrait creation process.

Thus, data on the bar code 20 is read by the bar code reader 28 (see FIG. 2 and step S5 of FIG. 7), and converted in the bar code decoding process in the CPU 25 to corresponding portrait data (see step S6 of FIG. 7), which is then stored in the portrait data area 26b of the RAM 26 (see FIG. 6) and then subjected to a portrait image creation process (see step S9 of FIG. 7) in accordance with a flowchart which is the same as that of FIG. 8.

In the portrait image creation process, a portrait image N1 which is the same as that 21A printed on the portrait area 21 corresponding to the traced bar code 20 is displayed on the display 3 (FIG. 10B).

By the depression of the print starting key 12 in the device body 1, the portrait image N1 is printed by the printer 30 on the printing tape 17 (FIGS. 1 and 2). Thus, a desired portrait image is obtained rapidly and securely without the need for a complicated key operation.

By the operations of the first-fourth cursor keys 13a–13d in the device body 1 to change some or all of the part patterns of the portrait image N1, displayed on the display 3, in accordance with the portrait image creation process of the flowchart of FIG. 8, the changed portrait image N2 (FIG. 10C) is created and displayed.

[Third Embodiment]

Figure 12:
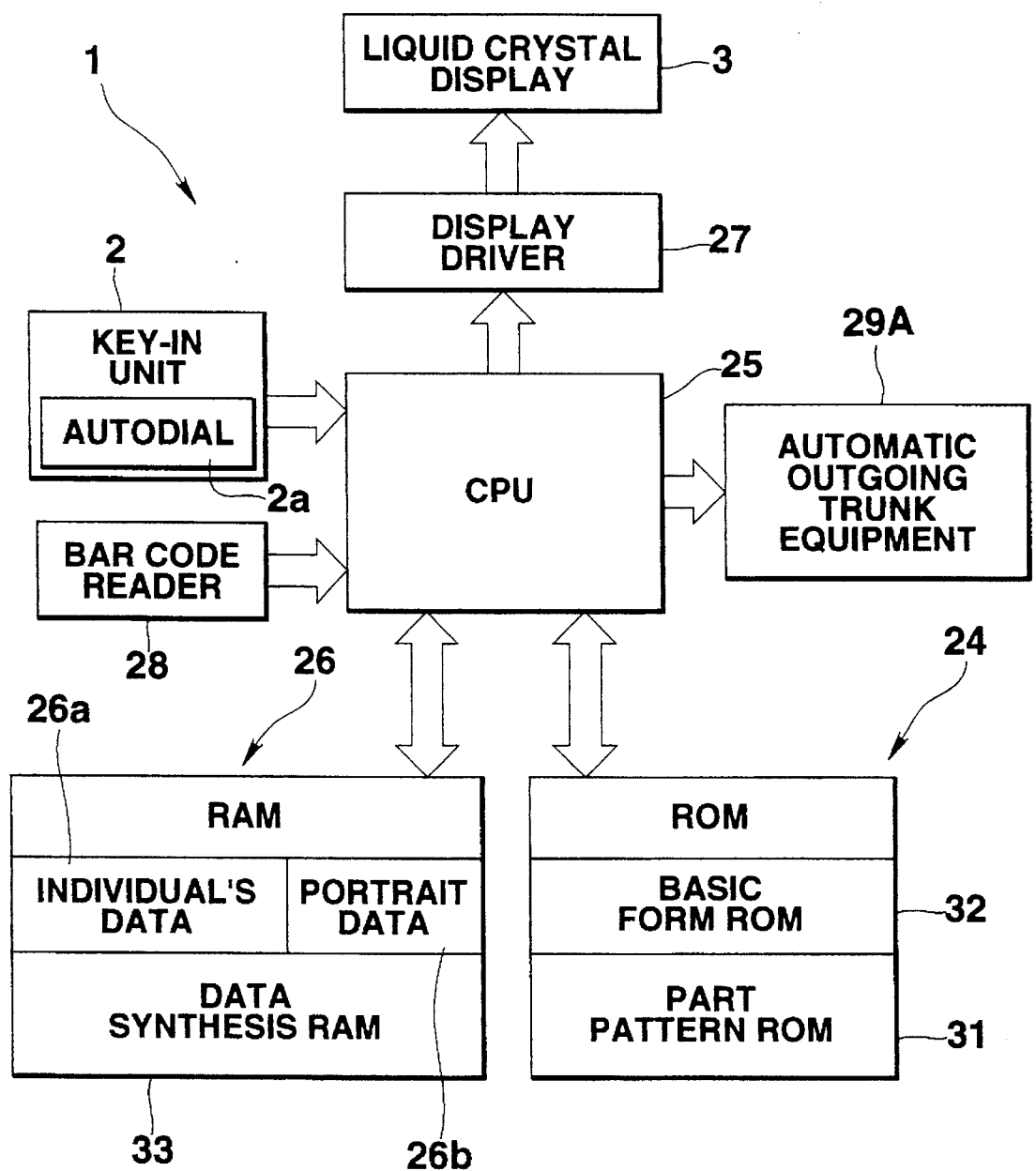
FIG. 12 is a block diagram indicative of a circuit structure used in a third embodiment of the present invention.

FIG. 12 shows an object image creation device as a third embodiment of the present invention. As shown in FIG. 12, the third embodiment is the same in structure as the first embodiment (FIG. 2) except that in the third embodiment automatic outgoing trunk equipment 29A is provided which outputs a dial tone on the basis of the "telephone number" data of the individual's data stored in the individual's data storage area 26a of the RAM 26 in the device body 1. In the device of FIG. 12, although a printer controller and a printer such as those shown in FIG. 2 are provided, they are not shown for simplifying purposes.

Figure 13A:
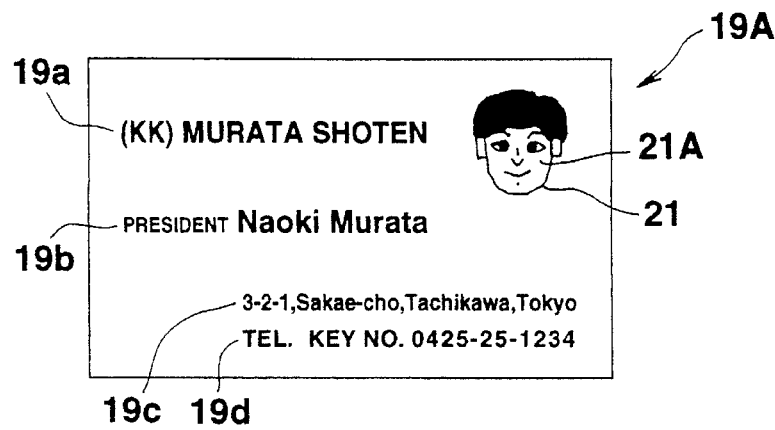
FIG. 13A illustrates a print on a front of a calling card.
Figure 13B:
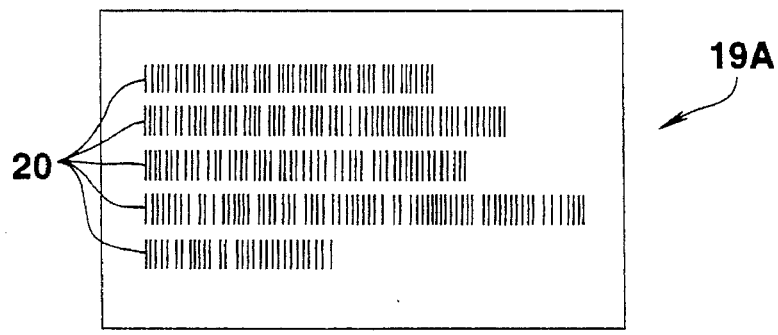
FIG. 13B shows illustrative bar code data printed on the back of the calling card of FIG. 13A.

As in the first embodiment, the calling card 19A is adapted to be inserted into the card inlet 18 in the device body 1 in the third embodiment. As shown in FIG. 13A, the calling card 19A has a person's portrait 21, his company name 19a, his name 19b, address 19c and telephone number 19d printed on the front of the card. As shown in FIG. 13B, a bar code 20 indicative of those data items is printed on the back of the card.

Figure 13C:
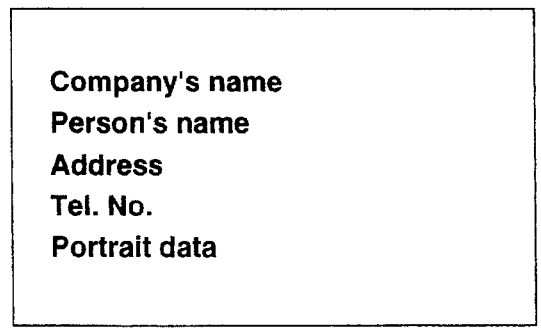
FIG. 13C shows the contents of the bar code data of FIG. 13B.

As shown in FIG. 13C, the printed five-row bar codes 20 printed on the back of the calling card 19 represent individual's data items which include the person's company name, his name, address, telephone number, and portrait data on the printed portrait image 21A (the respective part pattern numbers) arranged in this order. Among the bar code data, data on the person's company name, his name, address and telephone number is adapted to be stored in the individual's data area 26a of the RAM 26. The portrait data is adapted to be stored in the portrait data area 26b of the RAM 26.

When the calling card 19A is inserted into the card inlet 18 in the device body 1, the bar code 20 printed on the back of the card 19A is read by the bar code reader 28, decoded and converted to the corresponding bar code data. The individual's data of the converted bar code data (individual's data including data on the person's company name, his name, address and telephone number) is stored in the individual's data area 26a of the RAM 26. The portrait data is stored in the portrait data area 26b of the RAM 26. Part pattern data is read from the part pattern ROM 31 on the basis of the portrait data (the part pattern numbers) of the stored data, and synthesized in the data synthesis RAM 33. Thus, the same portrait image as the portrait image 21A is displayed on the display 3. Simultaneously, by the operation of the autodial starting key 2a of the key-in unit 2, a dial tone is output from the automatic outgoing trunk equipment 29A on the basis of the telephone number data of the stored individual's data. In addition, the person's company name, his name, address and telephone number are displayed on the display 3 on the basis of the corresponding data items of the stored individual's data.

As a result, only by insertion of the calling card 19A into the card inlet 18 in the device body 1, the same portrait images as that 21A printed on the front of the card 19A is displayed on the display 3. Simultaneously, the telephone number corresponding to the portrait image 21A is output as the corresponding dial tone from the automatic outgoing trunk equipment 29A. Thus, the portrait image of the target person and his individual's data can be confirmed on the display 3 while the person is being called securely and rapidly without dialing the telephone number manually.

As shown in FIG. 13B, in the third embodiment, the bar code reader 28 reads the bar code 20 printed on the back of the calling card 19A. The CPU displays the same portrait image N1 as the portrait image 21A printed on the front of the calling card 19A on the display 3 (FIG. 10B) on the basis of the individual's data corresponding to the read bar code and portrait data, and outputs the corresponding dial tone from the automatic outgoing trunk equipment 29A. However, the present invention is not limited to such structure alone.

Figure 14:
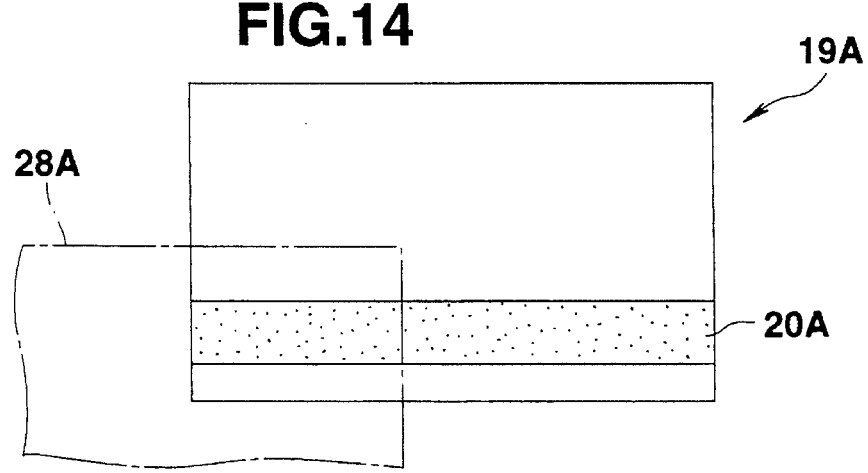
FIG. 14 is a cross-sectional view of a calling card with a magnetic stripe provided on the back of the calling card instead of the bar code data.

For example, as shown in FIG. 14, the individual data including the person's company name, his name, address and telephone number, and the portrait data may be recorded magnetically on a magnetic stripe 20A on the back of the calling card 19A in a system different from the bar code system in which the individual's data is printed on the back of the calling card of FIG. 13B although the same individual's data and portrait data as the data of FIG. 13A are printed on the front of the calling card 19A.

In this case, the magnetic reader 28A provided in the device body 1 reads the individual's data and the portrait data magnetically recorded in the stripe 20A on the calling card 19A. The read individual's data and portrait data are decoded in a manner similar to the bar code decoding process at step S6 of FIG. 7. A portrait creation process at step S9 of FIG. 7 is then performed on the basis of the decoded individual's data and portrait data. A portrait image N1 which is the same as the portrait image 21A printed in the portrait print area 21 is displayed on the display 3 (FIG. 10B) and the corresponding dial tone is output from the automatic outgoing trunk equipment 29A in the portrait creation process.

[Fourth Embodiment]

FIGS. 15–25B show a portrait game device as a fourth embodiment of the present invention. The element of the fourth embodiment which is the same as that of the first embodiment is identified by the same reference numeral as that used for the latter element and further description of that element will be omitted.

Figure 15:
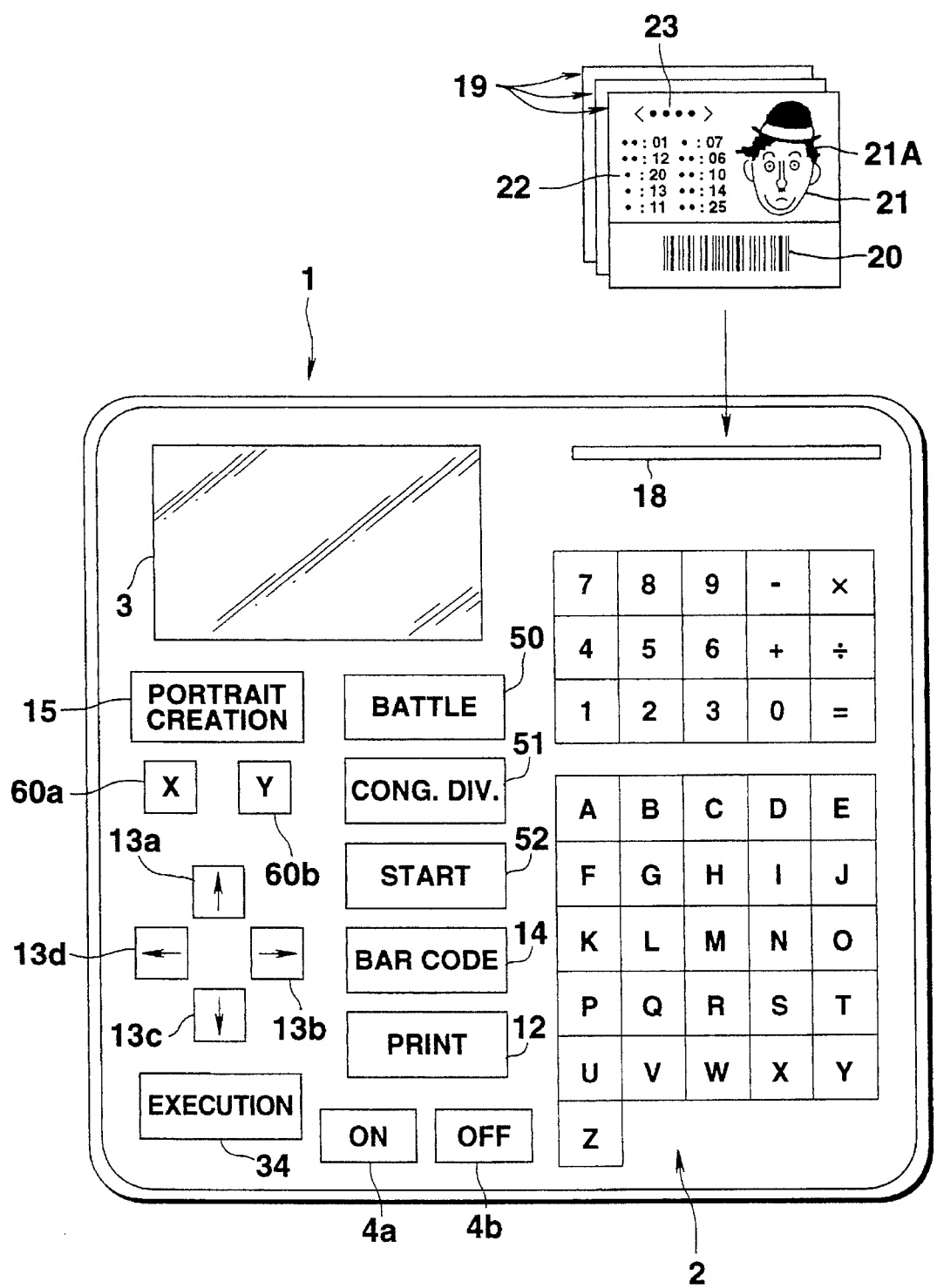
FIG. 15 illustrates a portrait game device as a fourth embodiment of the present invention.

In FIG. 15, the device body 1 is provided with an on key 4a and an off key 4b which are used to turn on and off the power source, respectively; a portrait creation mode key 15; game portrait selection keys 60a, 60b; part designating keys 13a, 13b; pattern selection keys 13c, 13d; an execution key 34; a battle key 50; a congeniality divination key 51; and a starting key 52.

The battle key 50 is operated when a battle game mode is set in which the battle game is played on the basis of the recorded battle portrait data; the congeniality divination key 51 is operated when a congeniality divination game mode is set in which congeniality divination is made on the basis of the recorded congeniality portrait data; the starting key 52 is operated when the respective battle and congeniality divination games are started in the battle and congeniality divination game modes, respectively.

Figure 16:
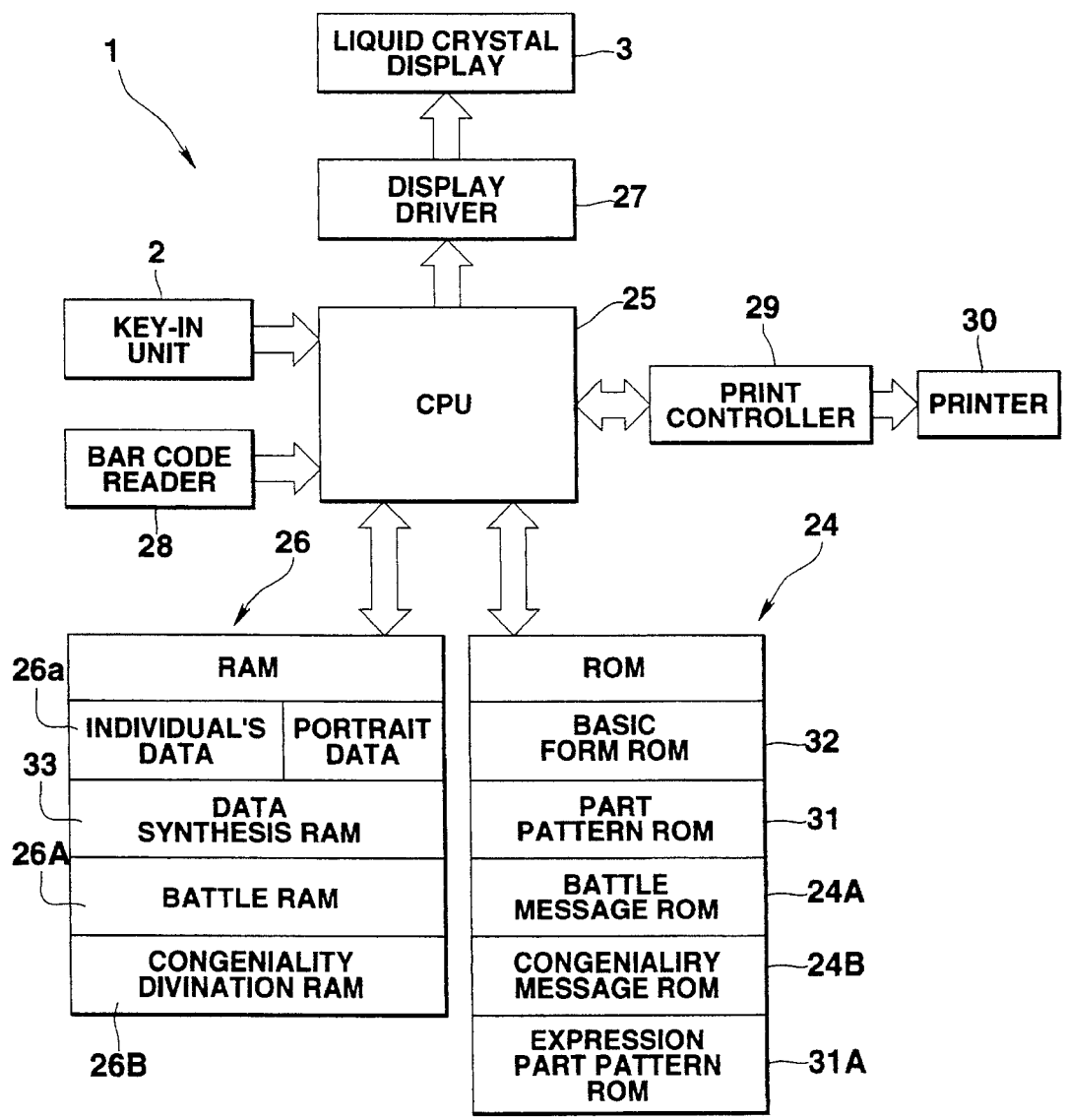
FIG. 16 is a block diagram of an electronic circuit of the portrait game device as the fourth embodiment of FIG. 15.

FIG. 16 is a block diagram of the whole structure of an electronic circuit of the portrait game device. The portrait game device is provided with a CPU 25 which is connected to a key-in unit 2 which has the battle key 50, congeniality divination key 51, starting key 52, etc.; a bar code reader 28; a ROM 24; a RAM 26; a display 3 connected through a display driver 27; and a printer 30 through a print controller 29.

The ROM 24 is provided with a basic form ROM 32, a part pattern ROM 31, an expression part pattern ROM 31A, a battle message ROM 24A, and congeniality message ROM 24B. The RAM 26 is provided with an individual's area 26a, and a portrait data area 26b, a data synthesis RAM 33, a battle RAM 26A and a congeniality divination RAM 26B.

FIG. 17A shows expression patterns stored in the expression pattern ROM 31A used in the battle game. The respective display patterns prepared in each of the areas 31Y of the expression part pattern ROM 31A used in the battle game include the respective expression part patterns of the "eyes" and "mouth" used when the game is won, lost, and drawn, in correspondence to the patterns of the "eyes" and "mouth" of the parts, data on which is stored in the part pattern ROM 31, although in this FIGURE the expression part patterns of the respective "eyes" used when the game is drawn and the expression part patterns of "mouth" are not shown.

FIG. 17B shows expression part patterns stored in the expression part pattern ROM 31A used in the congeniality divination game. The respective display patterns prepared in each of the areas 31Z of the expression display part pattern ROM 31A used in the congeniality divination game are expression patterns of the parts "eyes" and "mouth" and related "background" (this last-mentioned expression pattern is not shown in FIG. 17B) used when the degree of congeniality is high, low and medium, in correspondence to the respective patterns of the parts "eyes" and "mouth" in the part pattern RAM 31, although in FIG. 17B the expression patterns of "eyes" used when the degree of congeniality is medium, and the respective expression patterns of the part "mouth" are not shown.

FIG. 18 shows battle result messages stored in the battle message ROM 24A, which stores beforehand in the respective areas 24a result messages different in dependence on the victory, defeat and draw of the battle. For example, a victory message used as the result of victory of the battle is "I won, wo !!"; a defeat message used as the result of defeat of the battle is "I lost. Please, pardon me !!" and a draw message used as the result of draw of the game is "Mmm . . . ".

FIG. 19 shows the congeniality messages stored in the congeniality message ROM 24B, which stores different congeniality messages used in dependence on the result of the congeniality divination in the respective areas 24b. The respective messages have contents depending on the difference in score between the sum of part pattern numbers indicative of the respective part patterns of any portrait image for congeniality divination and the sum of part pattern numbers indicative of the respective part patterns of another portrait image for the congeniality divination. When the score difference is "0"–"3" the congeniality messages "Complete congeniality !" and "What a delight !" are used which are stored beforehand as being combined with the corresponding portrait image. When the score difference is "4"–"15", the congeniality messages "That's about right !" and "Let's be good neighbors !" are used which are stored beforehand as being combined with the corresponding portrait image. When the score difference is "16"–"29", the congeniality message "No congeniality !" and "Let's compete in a battle game !" are used when are stored beforehand as being combined with the corresponding portrait image.

The operation of the portrait game device having the above structure will be described below.

<Creation of a Portrait Image>

Data on at least two persons's portraits and their individuals' data are input and recorded, as shown in FIG. 7, before the portrait game starts. First, for one person, the initial picture is displayed (step S1); it is determined whether the bar code key 14 has been operated (step S2); it is determined whether the individuals' data has been input (step S3) and, if so, the individual's data is stored (step S4); a portrait card 19 is inserted and its bar code data is read by the bar code reader 28 (step S5) and the bar code is decoded (step S6); it is determined whether decoding the bar code data has been completed (step S7); the portrait data corresponding to the read bar code data is stored in the portrait data area 26a of the RAM 26 (step S8); a portrait image is created and displayed on the basis of the portrait data (step S9). Subsequently, for the remaining persons, a similar series of similar operations will be performed by the required number of times.

<Battle Game Process>

Figure 20:
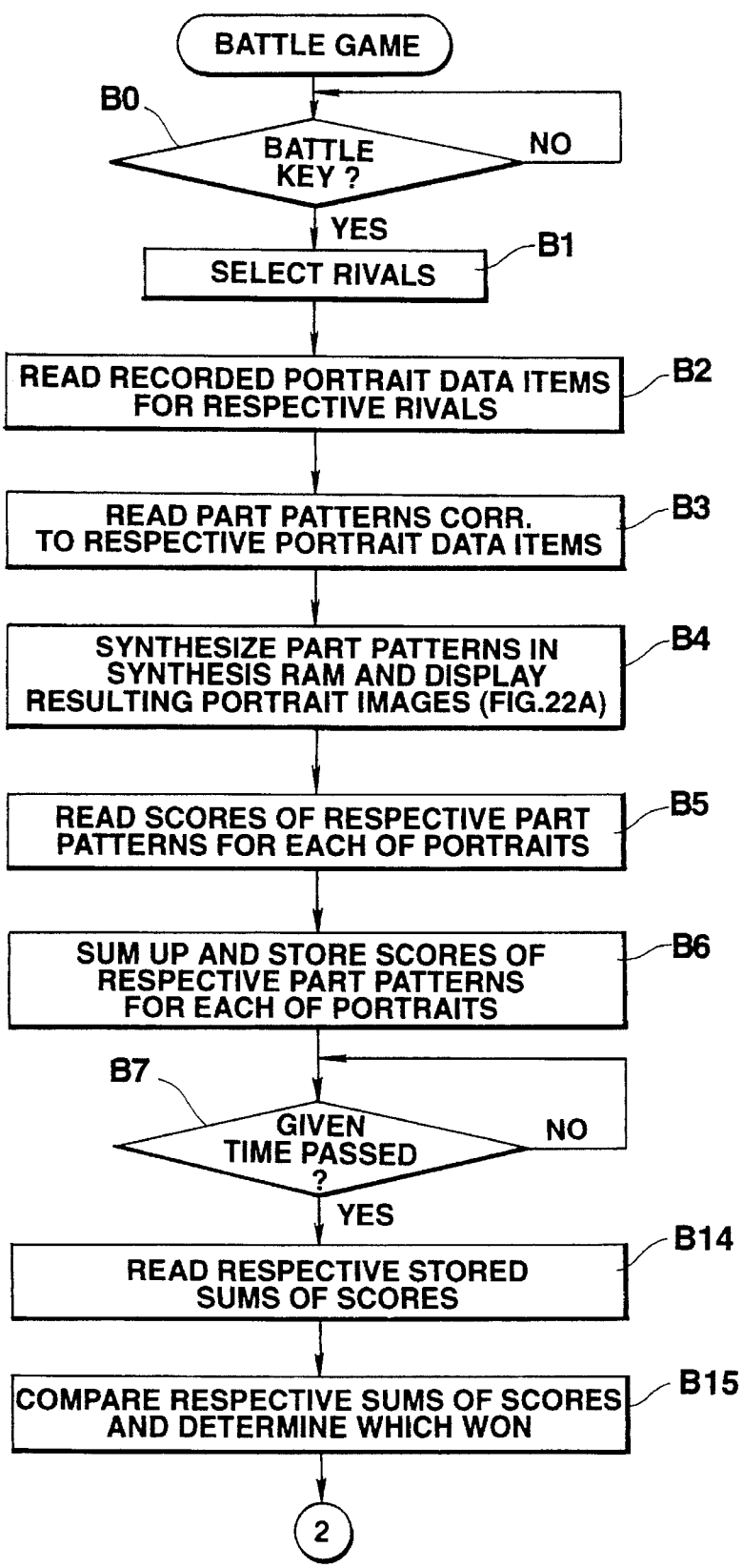
FIG. 20 is a flowchart indicative of the former half process of a battle game.
Figure 22A:
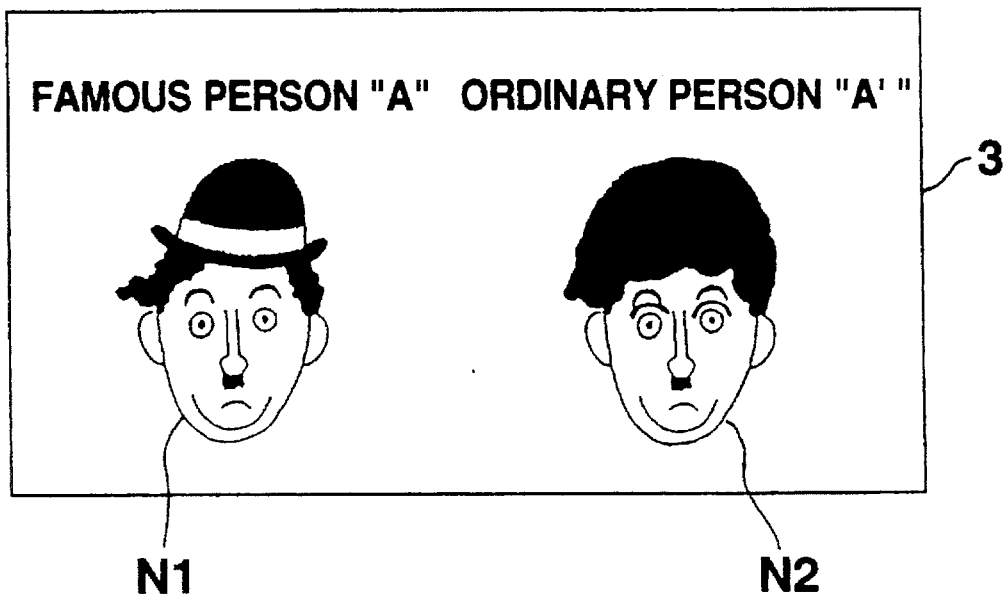
FIG. 22A illustrates the respective displayed portrait images recorded in the battle game.
Figure 22B:
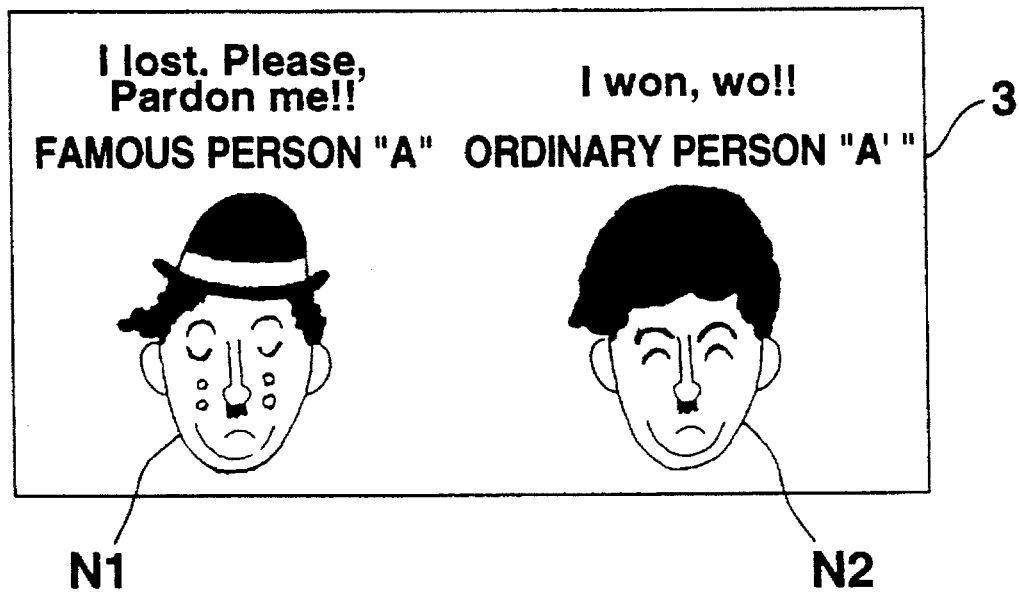
FIG. 22B illustrates the respective portrait images displayed as the result of the game involved in the battle game.

A battle game process based on portraits starts. FIGS. 20 and 21 show the former and later halves, respectively, of the battle game process. FIGS. 22A and 22B each show the displayed portrait images N1 and N2 of two rivals X and Y involved in the battle game process.

First, when in the former half of the battle game process of FIG. 20 the battle key 50 is operated (step B0), the CPU 25 sets a battle game mode.

The respective portrait images N1 and N2 of two rivals in the game are selected by the operation of the portrait selection keys 60a and 60b from among the portrait images stored in the above manner (step B1). For example, when the respective portrait images N1 and N2 of a famous person "A" and an ordinary person "A'" are selected, data on the portraits of the famous person "A" and the ordinary person "A'" (FIG. 6) recorded in the portrait data area 26b of the RAM 26 are read (step B2).

Data on the respective part patterns corresponding to the portraits of the famous person "A" and the ordinary person "A'" read from the RAM 26 is read from the part pattern ROM 31 (step B3). The read data on the respective part patterns is synthesized in the data synthesis RAM 33. Thus, as shown in FIG. 22A, the respective portrait images N1 and N2 of the famous person "A" and the ordinary person "A'" are displayed for the battle game (step B4). Simultaneously, the names of the famous person "A" and the ordinary person "A'" are displayed on the same display 3 (In this example, assume that the famous and ordinary persons "A" and "A'" imply their names as well).

Simultaneously, portrait data corresponding to the respective part patterns of each of the portrait images N1 and N2 of the famous person "A" and the ordinary person "A'" is read as the battle scores (step S5). The respective read battle scores are summed up for each of the portrait images N1 and N2 and the respective sums of the battle scores are then stored in the summed-up score storage areas of the battle RAM 26A of FIG. 16 (step B6).

As shown in FIG. 22A, when it is determined at step B7 that a given time, for example, of three seconds, has passed in a state where the portrait images N1 and N2 of the famous person "A" and the ordinary person "A'" as the battle rivals are displayed, the respective sums of the battle scores stored in the respective summed-up score storage areas (FIG. 16) for the famous person "A" and the ordinary person "A'" in the battle RAM 26A are read (step B14). By comparison of the respective sums of the battle scores, it is determined at step B15 which of the famous person "A" and the ordinary person "A'" won. In the case of this embodiment, the sum of the respective part pattern numbers of FIGS. 10B and 10C for the famous person "A" is 119 while it is 128 for the ordinary person "A'". Therefore, it is determined that the ordinary person "A'" won whereas the famous person "A" lost.

When it is determined at step B21 that the sum of the battle scores of the portrait image of the famous person "A" is larger than that of the portrait image of the ordinary person "A'", or that the famous person "A" lost whereas the ordinary person "A'" won, data on the part patterns of "eyes" and "mouth" indicative of the result of the defeat and corresponding to the part pattern numbers of the "eyes" and the "mouth" of the portrait image of the famous person "A" as the losing side is read from the part pattern 31A whereas data on the part patterns of "eyes" and "mouth" indicative of the result of the victory and corresponding to the part pattern numbers of the "eyes" and the "mouth" of the portrait image of the ordinary person "A'" as the winning side is read from the part pattern 31A (step B26) The defeat message "I lost Pleas pardon me !!", data on which is stored beforehand in the battle message ROM 24A, is read for the famous person "A" side whereas the victory message "I won, wo !!" is read for the ordinary person "A'" side (step B27).

Thus, for example, in FIG. 22B, the expression of the portrait image of the famous person "A" is changed to a sad one and displayed along with the defeat message "I lost, Please, pardon me !!". The portrait image of the ordinary person "A'" is changed to a delightful one and displayed along with the victory message "I won, wo !!" (step B29).

When it is determined at step B16 in the victory/defeat determining process that the sum of the battle scores of the portrait image of the famous person "A" is equal to that of the ordinary person "A'" data on the part patterns of the "eyes" and "mouth" and corresponding to the part pattern numbers of the "eyes" and "mouth" of the respective portrait images is read from the part pattern ROM 31A (step B17). Thereafter, data on the draw message in "Mmm . . . " stored beforehand in the battle message ROM 24A is read (step B18).

The data on the part patterns of the "eyes" and "mouth" of the respective portrait images of the famous person "A" and the ordinary person "A'" is transferred to the data synthesis RAM 33 to replace only data on the corresponding part patterns of the "eyes" and "mouth" of the respective displayed portrait images of the famous person "A" and the ordinary person "A'" and the resulting portrait images are combined with the draw message "Mmm . . . " read from the battle message ROM 24A (step B19), and displayed along with the message on the display 3 (step B20).

When it is determined at step B21 that the summed-up battle scores of the portrait image of the famous person "A" is larger than that of the ordinary person "A'" or that the famous person "A" is a winner and the ordinary person "A'" is a loser, the part patterns of the parts "eyes" and "mouth" of the portrait image of the famous person "A" of the winning side for display of the result of the victory are read from the expression part pattern ROM 31A in correspondence to the part pattern numbers of the famous person "A".

The part patterns of the "eyes" and "mouth" of the portrait image of the ordinary person "A'" of the losing side for display of the result of the defeat are read from the expression part pattern ROM 31A in correspondence to the part pattern numbers of the "eyes" and "mouth" of the portrait image of the ordinary person "A'" (step B22). Thereafter, the victory message "I won, wo !!" stored beforehand in the battle message ROM 24A is read for display of the famous person "A" side while the defeat message "I lost. Please, pardon me !!" stored beforehand in the battle message ROM 24A is read for display of the ordinary person "A'" side (step B23).

Thus, the expression of the portrait image of the famous person "A" is changed to a delightful one which is displayed along with the victory message "I won, wo !" whereas the expression of the portrait image of the ordinary person "A'" is changed to a sad one which is displayed along with the defeat message "I lost. Please, pardon me !!" (step B25).

<Congeniality Divination Game>

Figure 23:
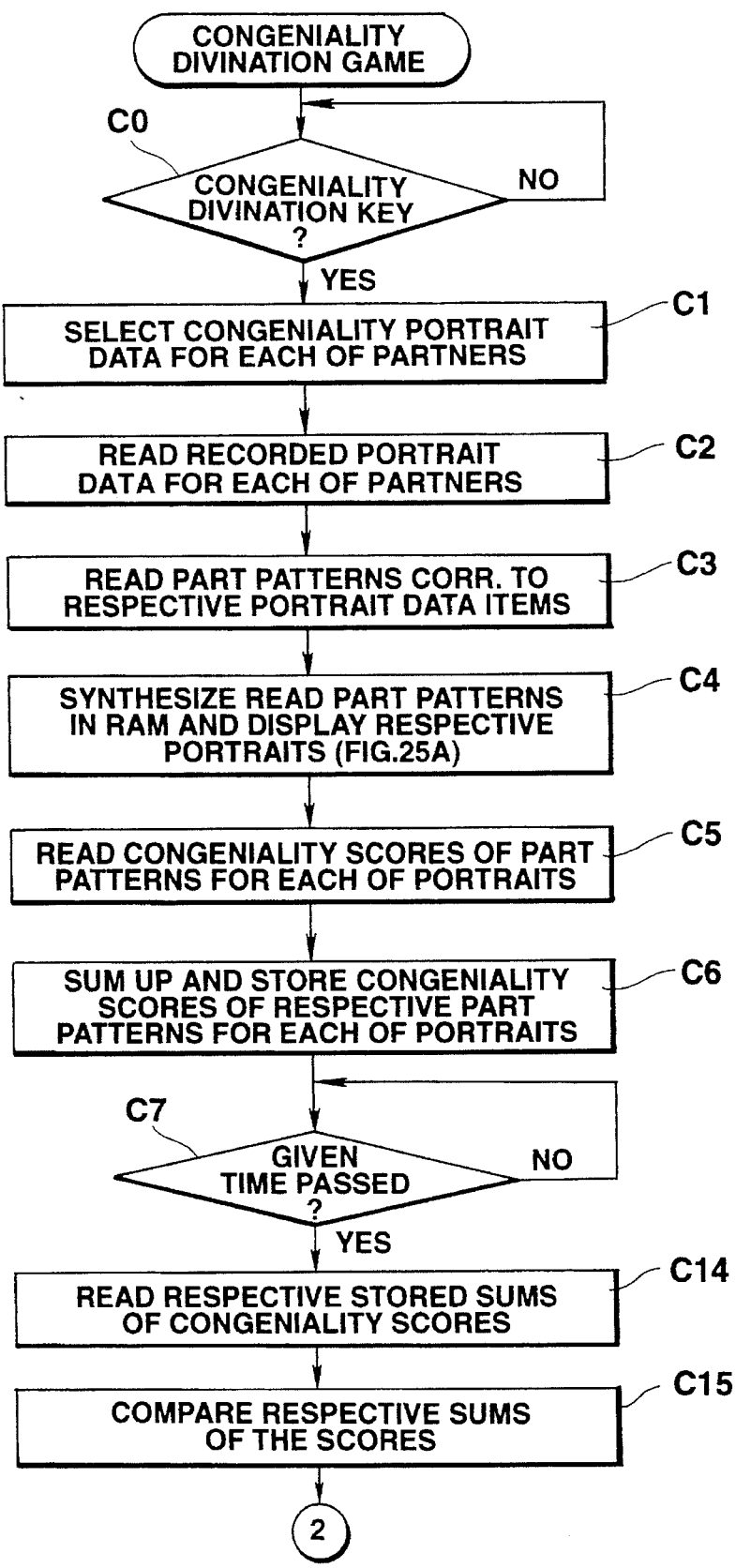
FIG. 23 is a flowchart indicative of the former half process of a congeniality divination game.
Figure 24:
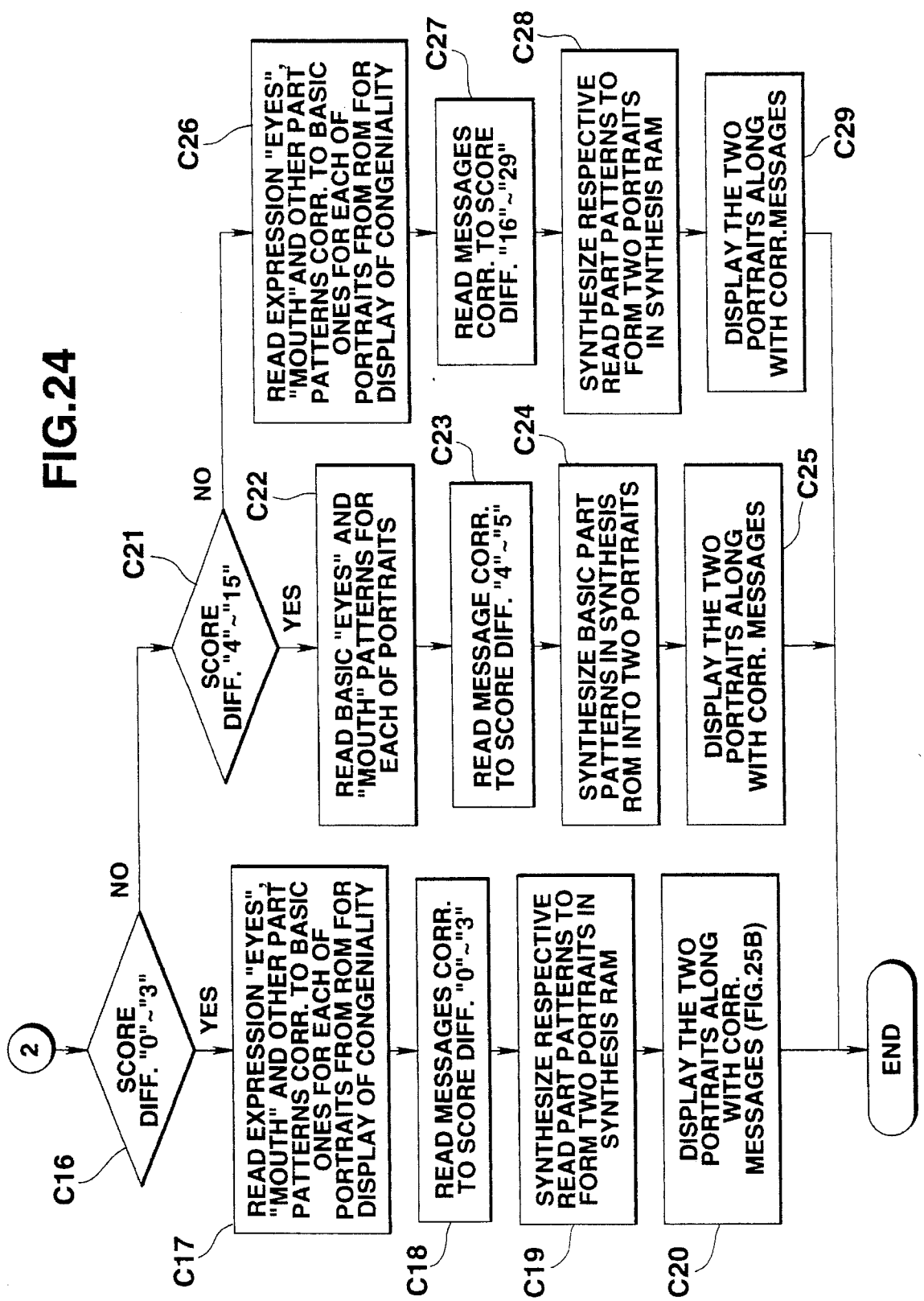
FIG. 24 is a flowchart indicative of the latter half process of the congeniality divination game.
Figure 25A:
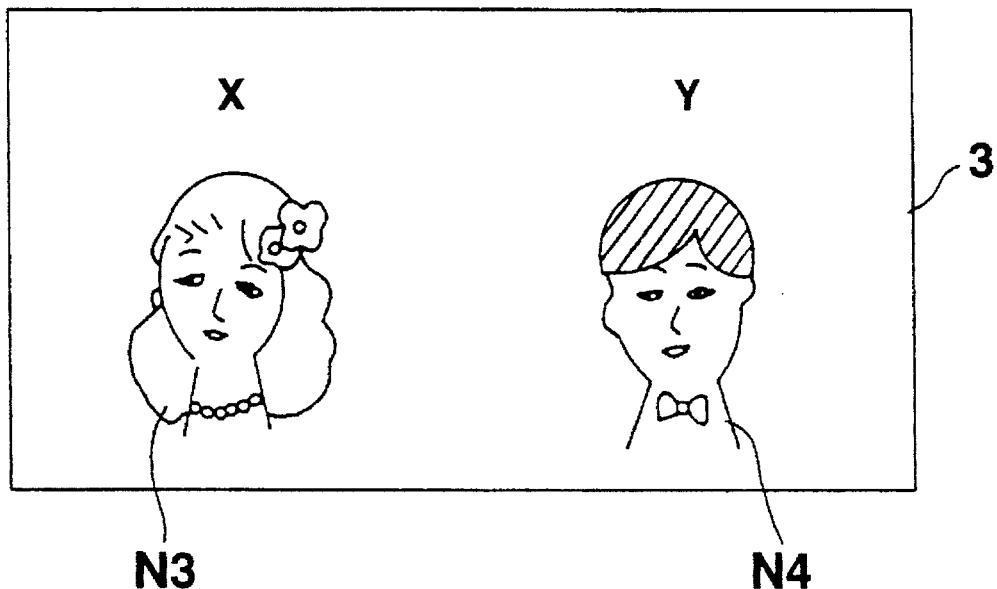
FIG. 25A illustrates the respective portrait images recorded in the congeniality divination game.
Figure 25B:
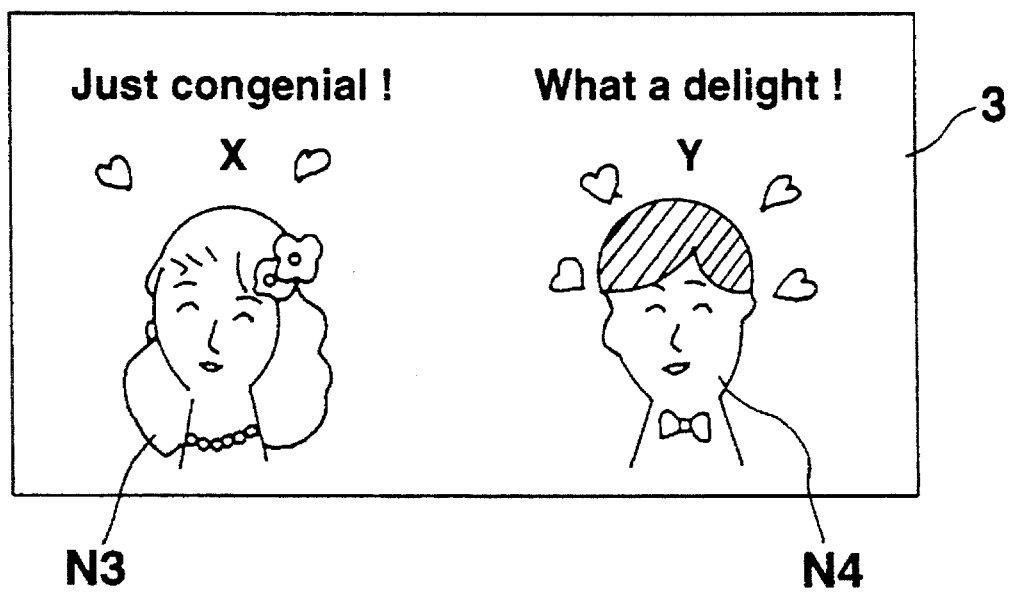
FIG. 25B illustrates the respective portrait images displayed as the result of the battle involved in the congeniality divination game.

FIG. 23 shows the former half process of a congeniality divination game performed by the portrait game device, and FIG. 24 shows the latter half process of the game. FIGS. 25A and 25B show the displayed portrait images of partners X and Y involved in the congeniality divination game.

This process is performed as in the case of a battle game shown in FIG. 7. First, data on at least two partners' portraits and their individual data are input and recorded. More particularly, for one partner, first, it is determined whether the bar code key 14 has been operated (step S2); the bar code data of the inserted portrait card 19 is read and decoded by the bar code reader 28 (step S3), and the corresponding portrait data is read and stored in the RAM 26 (step S4); and a portrait image is created on the basis of the portrait data and displayed. Subsequently, for the remaining partner, a series of operations similar to that just described is performed once more to thereby input and record data on the portrait of the other partner and his individual's data.

When in the former half process of the congeniality divination game of FIG. 23 the congeniality divination key 51 is operated (step C0), a congeniality divination game mode is set by the CPU 25. Two partners' portrait images for congeniality divination are selected from a plurality of portrait images, data on which is stored already (step C1). For example, when the portrait images of the partners X and Y are selected, portrait data items for X and Y such as those recorded in the portrait data RAM 26b of FIG. 6 are read (step C2).

The respective part patterns composing each of the portrait images of X and Y are read from the part pattern ROM 31 in correspondence to the respective read portrait data items on X and Y (step C3) and synthesized in the data synthesis RAM 33. Thus, as shown in FIG. 25A, the respective portrait images N3 and N4 of X and Y are displayed for congeniality divination (step C4).

Portrait data corresponding to the respective part patterns which constitute each of the images N3 and N4 of X and Y are read as congeniality scores from the RAM 26 (step C5) and summed up, and stored in the summed-up score storage areas in the congeniality divination RAM 26B (FIG. 16)(step C6).

When a given time, for example, of three seconds, has passed since the respective portrait images N3 and N4 of X and Y as the congeniality divination partners are displayed as shown in FIG. 25A (step C7), the sums of the congeniality divination scores stored in the summed-up score storage areas of X and Y in the congeniality divination portrait RAM 26B (FIG. 16) at step C6 are read (step C14), and the degree of congeniality between X and Y is determined by the comparison between the sums of the scores (step C15).

When it is determined at step C16 as the result of the determination of the degree of the congeniality that the score difference between the respective sums of the congeniality scores of X and Y portrait images is within a range of "0"–"3", or the degree of congeniality between X and Y is determined to be high, data on the "eyes" and "mouth" patterns for display of congeniality is read from the respective areas in the expression part pattern ROM 31A in correspondence to the part pattern numbers indicative of the parts "eyes" and "mouth" of the respective portrait images N3 and N4 of X and Y (step C17). The congeniality messages "Just congenial !" and "What a delight !" corresponding to the score difference "0"–"3" stored in the congeniality message ROM 24B are read (step C18).

The congeniality patterns of the "eyes" and "mouth" corresponding to each of the portrait images N3 and N4 read from the expression part pattern ROM 31A are then transferred to the data synthesis RAM 33 to replace the part patterns of the corresponding "eyes" and "mouth" of the current displayed portrait images N3 and N4 of X and Y, and the resulting portraits N3 and N4 are combined with the congeniality messages "Just congenial !" and "What a delight !", respectively read from the congeniality message ROM 24B (step C19).

Thus, for example, as shown in FIG. 25B, delightful expression changes are added to the respective portrait images N3 and N4 of X and Y and the resulting portrait images N3 and N4 are displayed. Simultaneously, a congeniality background pattern such as that having a "heart" shape shown in FIG. 25B stored in the ROM 31A of FIG. 17B, and data on the congeniality messages "Just congenial !" and "What a delight !" stored in the congeniality message ROM 24B of FIG. 19 are read and displayed (step C20).

When it is determined at step C21 that the difference between the respective sums of the congeniality scores of X and Y is in a range of "4"–"15", or that the degree of congeniality between X and Y is medium, the patterns of parts "eyes" and "mouth" corresponding to the part pattern numbers indicative of the patterns of the parts "eyes" and "mouth" of each of the portrait images N3 and N4 of X and Y are read from the part pattern ROM 31 (step C22). Thereafter, the medium congeniality messages "That's about right !" and "Let's be good neighbors !" corresponding to the score difference "4"–"15" stored beforehand in the congeniality message ROM 24B are read (step C23).

The "eyes" and "mouth" patterns corresponding to the portrait images N3 and N4 of X and Y read from the part pattern ROM 31 are then transferred to the data synthesis RAM 33 to replace the corresponding "eyes" and "mouth" patterns of the current displayed portrait images N3 and N4 of X and Y, and the resulting portrait images N3 and N4 are combined with the medium congeniality message "That's about right !" and "Let's be good neighbors !" read from the congeniality message ROM 24B (step C24).

Thus, the respective portrait images N3 and N4 of X and Y are displayed on the display 3. Simultaneously, an half-congeniality background pattern (not shown) stored beforehand in the ROM 31A of FIG. 7B is read and displayed and the half-congeniality messages "That's about right !" and "Let's be good neighbors !" stored in the congeniality message ROM 24B of FIG. 19 is read and displayed (step C25).

When it is then determined at step C21 that the score difference between the respective sums of the congeniality scores of the portrait images of X and Y is more than "16", or that the degree of congeniality between X and Y is low, the patterns of the parts "eyes" and "mouth" for display of the result of uncongeniality are read from the expression part pattern ROM 36A in correspondence to the part pattern numbers indicative of the patterns of the parts "eyes" and "mouth" of each of the portrait images of X and Y (step C26).

In addition, uncongeniality messages "uncongenial !" and "Let's compete in a battle game !" corresponding to the score difference "16"–"29" and stored beforehand in the congeniality message ROM 24B are read (step C27).

Uncongeniality result patterns of the "eyes" and "mouth" corresponding to the respective portrait images N3 and N4 of X and Y read from the expression part pattern ROM 36A are transferred to the data synthesis RAM 33 to replace those corresponding patterns of the current displayed portrait images N3 and N4 of X and Y, and the resulting portrait images are combined with the uncongeniality messages "uncongenial !" and "Let's compete in a battle game !" read from the congeniality message ROM 24B (step C28).

Thus, the respective displayed expressions of the portrait images N3 and N4 of X and Y are changed to sad ones, which are then displayed . Simultaneously, an uncongeniality background pattern (not shown) stored beforehand in the ROM 31A of FIG. 17B is read and displayed, and the uncongeniality messages "Uncongenial !" and "Let's compete in a battle game !" stored in the congeniality message ROM 24B of FIG. 19 is read and displayed (step C29).

As described above, in the portrait game device of this structure, first, at least two respective portrait cards 19 are inserted into the inlet, the bar codes 20 printed on the cards 19 are read by the bar code reader 28, portrait data corresponding to the read bar code data is stored in the portrait data RAM 26, and portrait images N3 and N4 are created on the basis of the portrait data and then displayed. The part patterns involved in the respective recorded portrait data are read from the part pattern ROM 31, and combined in the data synthesis RAM 33 and the resulting portrait images are displayed side by side on the display 3.

In the case of the battle game, battle scores (portrait data) corresponding to the respective part patterns of the portrait images N3 and N4 are read and summed up for the respective portrait images N3 and N4. Those sums of the battle scores are compared to determine the victory and defeat of the game for the rivals. The expression of the portrait image of the winning side is changed to a delightful one, and the victory messages are displayed on the display 3 along with the portrait image having that delightful expression. The expression of the portrait image of the losing side is changed to a sad one, and the portrait image having that sad expression is displayed along with the defeat messages.

In the case of the congeniality divination game, congeniality scores (portrait data) corresponding to the part patterns of the respective portrait images are read from the RAM 26b, are summed for the respective portrait images, the resulting sums of the congeniality scores are compared to determine the degree of congeniality of the portrait images in accordance with the resulting score difference. When the score difference is small, the expressions of the respective portrait images are changed to delightful ones, which are then displayed along with the corresponding congeniality messages on the display 3 whereas when the score difference is large, the expressions of the respective portrait images are changed to sad ones, which are then displayed along with the corresponding uncongeniality messages on the display 3.

Since the device has such structure, a battle game in which both the portrait images created by the use of the portrait cards 19 battle with each other on the basis of those portrait images or a congeniality divination game in which the degree of congeniality between both the portrait images is divined on the basis of those portrait images is played. The result of the battle and the degree of congeniality between both the portrait images are objectively and easily understood by viewing changes in the expressions of the portrait images and the displayed contents of the messages to thereby provide very interesting games.

While in the present embodiment the result of the battle and the degree of congeniality between both the portrait images are displayed, using the sums of battle scores and congeniality scores (portrait data) corresponding to the part patterns of the respective portrait images, the present invention is not limited those particular cases. The sums of, or difference between, the portrait data on the respective portrait images and corresponding predetermined coefficients may be used as battle scores or congeniality scores to display the result of battle and degree of congeniality between both the portrait images.

While in the present embodiment a battle game in which both the portrait images created by the use of the portrait cards 19 battle or a congeniality divination game in which the degree of congeniality between both the portrait images is divined is played on the basis of those portrait images, arrangement may be such that groups of bar codes printed on any medium such as a sheet or label may be read by the bar code reader; portrait data (part pattern numbers indicative of the patterns of the parts which constitute an object image) is created on the basis of the respective read bar code data; and a battle game in which both the portrait images battle or a congeniality divination game in which the degree of congeniality between both the portraits is divined is played, on the basis of the created respective portrait data.

While in the description of the battle game or the congeniality divination game in the respective embodiments, the face portrait images have been used as the portrait images, a battle game or congeniality divination game using portrait images each involving the whole body of a person may be played as in the respective embodiments.

While in the fourth embodiment storage of the part patterns of a human being as a motif in the part pattern ROM 31 has been described, the present invention is not limited to it. Data on part patterns of a face or a body of an animal as a motif may be stored in the part ROM 31 such that a battle game or congeniality divination between a human being and an animal or a battle game or congeniality divination between animals may be displayed.

While in the fourth embodiment printed bar code data is read and a battle game or congeniality divination game is played on the basis of the read bar code data, arrangement may be such that individual's data and portrait data magnetically recorded on a magnetic stripe 20A of FIG. 14 is read by a magnetic reader 28A provided in the device body 1 and is subjected to decoding similar to bar code decoding at step S6 of FIG. 7; portrait creation at step S9 of FIG. 7 is performed on the basis of the decoded individual data and portrait data; at least two portrait images are displayed on the display 3 (FIG. 10B) in accordance with the portrait creation process; battle or congeniality scores (portrait data) corresponding to the part patterns of the respective portrait images are summed up, and the result of the battle or the degree of congeniality between both the portraits is displayed, using the respective sums of the battle or congeniality scores.

[Fifth Embodiment]

Figure 26:
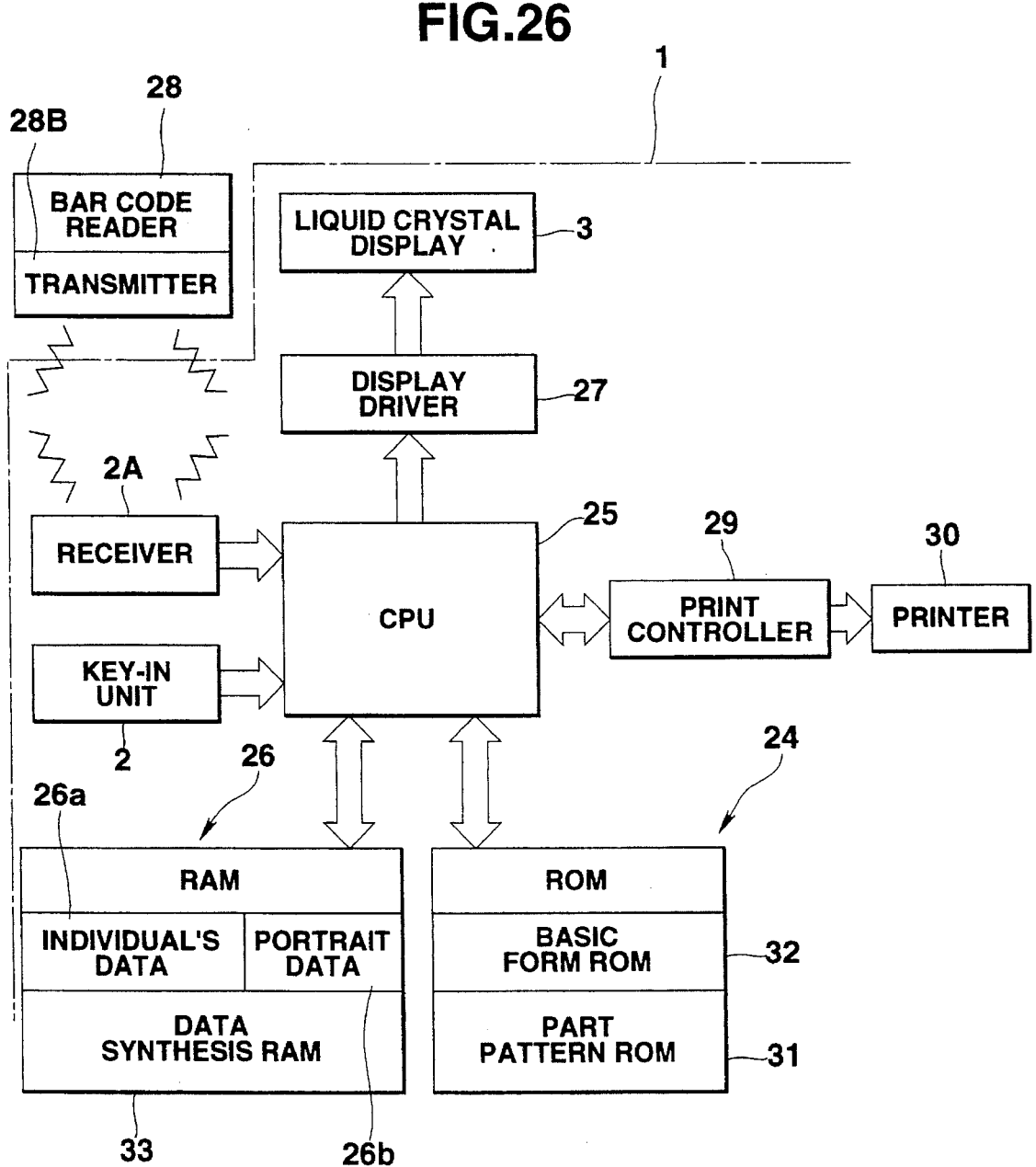
FIG. 26 is a block diagram of an electronic circuit of a portrait creation device as a fifth embodiment of the present invention.

FIG. 26 shows a portrait image creation device as a fifth embodiment of the present invention. In the second embodiment (FIG. 11), the bar code reader 28 is connected through the connection cord 60A to the device body 1.

In contrast, in the fifth embodiment, as shown in FIG. 26, a receiver 2A is provided in the device body 1 while a transmitter 28B is provided in the bar code reader 28. The bar code data read by the bar code reader 28 is transmitted from the transmitter 28B through a communication medium such as radio waves or infrared rays to the receiver 2A such that the corresponding object image is created and displayed or a battle game or congeniality divination game is played on the basis of the received bar code data. The remaining structure of the fifth embodiment is the same as the corresponding structure of the second embodiment (FIG. 11) and the fourth embodiment (FIG. 15 to 25B).

[Other Modifications]

While in the respective embodiments the bar code 20 printed on the portrait card 19 or each of the portrait image pages 35a of the volume 35 is read by the bar code reader 28 and displayed or printed, part pattern numbers (portrait data) indicative of the respective part patterns may be beforehand as related data, and read by the bar code reader 28.

While in the respective embodiments portrait images of human beings or animals are displayed or printed, the image of an object such as a car or a building may be displayed or printed in addition to the portrait images of the human beings or animals.

While in the above embodiments (1) bar codes 20 prepared beforehand for portrait images printed on portrait cards 19 or a page of the volume 35 are read by the bar code reader 28, (2) portrait data is created on the basis of the read bar code data, and (3) portrait images N1 and N2 which are the same as those printed on the portrait cards 19 and the pages of the volume 35 are displayed or printed on the basis of the created portrait data, both of the portrait images and bar code 20 are not necessarily required to be printed.

For example, arrangement may be such that a bar code printed on any medium such as a sheet or a commodity management label is read by the bar code reader, a portrait data is created on the basis of the read bar code data, an unexpected portrait image which is not planned to be created beforehand may be displayed or printed, and a portrait image having a game property may be displayed or printed.

By such arrangement, the user can create portrait data on the basis of any read bar code data, and enjoy what shape of a portrait is displayed or printed on the basis of such created portrait image. In this case, when the user create portrait data on the basis of any read bar code data, he is required to determine beforehand which of the respective numerical data, converted on the basis of the bar code data items read as the portrait data should be used as the part pattern numbers.

As will be clear from the above description, according to the present invention, bar code data or magnetic recorded data are read by the read means, so that an object image which is the same as, or similar to, the image of a real object or a desired one is created rapidly and securely in a very simple operation.

According to another invention, by reading bar code data or magnetic recorded data with the read means and by inputting character data with character data inputting means, an object image which is the same as, or similar to, the image of a real object or a desired one, and desired character data are output rapidly and securely in a very simple operation.

According to still another invention, only by reading bar code data or magnetic recorded data with the read means, the portrait image or whole body image of a target person is confirmable by display or printing while calling the person securely and rapidly without a manual dialing operation of the telephone number.

According to a further invention, only by reading bar code data or magnetic recorded data with the read means, data on the result of a battle or the degree of congeniality between the respective object images is output.

What is claimed is:

1. An object image creation device for creating an object image including a plurality of parts selected from a plurality of part images, the selected part images corresponding to the plurality of parts being disposed at respective predetermined positions, the object image creation device comprising:

a medium on which code data corresponding to a face image is formed, the code data representing one set of designating data for respectively designating part images included in the object image;

read means for reading the code data formed on said medium;

storage means for storing and combining the plurality of part images of each of the plurality of parts with a plurality of designating data for designating said plurality of part images;

converting means for converting the code data read by said read means into a corresponding set of designating data for designating the part images included in the object image; and object image creating means for reading out from said storage means part images designated by a corresponding set of designating data converted by said converting means, the object image creating means disposing the part images read out by the read means to respective predetermined positions to create the object image corresponding to the code data formed on said medium.

2. The object image creation device according to claim 1, further comprising:

outputting means for outputting the object image created by said object image creating means.

3. The object image creation device according to claim 2, further comprising:

character data inputting means for inputting character data relating to the object image created by said object image creating means; and wherein said outputting means includes character data providing means for providing the character data input by said character data inputting means together with the object image created by said object image creating means.

4. The object image creation device according to claim 1, further comprising:

replacing means for replacing at least one of the plurality of part images of the object image created by said object image creating means with another part image stored in said storage means.

5. The object image creation device according to claim 1, wherein the designating data which designates part images includes numerical data formed on said medium, the numerical data designating the part images to be included in the object image.

6. The object image creation device according to claim 1, wherein:

said medium includes a plurality of object images and code data corresponding to the plurality of object images, the plurality of object images and code data being respectively disposed on the medium at locations corresponding to one other.

7. A object image creation device according to claim 1, wherein said code data includes bar code data.

8. An object image creation device for creating an object image including a plurality of parts selected from a plurality of part images, the selected part images corresponding to the plurality parts being disposed at respective predetermined positions, the object image creation device comprising:

printing medium on which an object image and data items related to respective part images which constitute the object image are printed;

read means for reading the related data items printed on said printing medium;

storage means for storing a plurality of part images for each of the plurality of parts which constitute an object, the storage means also storing numerical data corresponding respectively to part images;

object image creating means for reading out part images for each of the plurality of parts of the object from said storage means on the basis of the related data items, the object image creating means combining the read out part images to create an object image; and outputting means for reading and outputting numerical data from said storage means, the outputted data corresponding to the part images which constitute the object image created by said object image creating means.

9. A face image creation device for creating a face image including a plurality of parts selected from a plurality of part images, the selected part images of the plurality of parts being disposed at respective predetermined positions, the face image creation device comprising:

a medium on which an object image, code data corresponding to designating data for designating part images which respectively constitute the face image, and telephone number data corresponding to the face image are formed;

read means for reading the code data and the telephone number data;

storage means for storing a plurality of part images for each of the plurality parts which constitute a face;

converting means for converting the code data read by said read means into designating data for designating the part images included in the face image;

face image creating means for reading from said storage means part images designated by the designating data, and for disposing the read out part images at the predetermined positions to create a face image corresponding to the code data;

outputting means for outputting the face image created by said face image creating means; and dial tone outputting means for outputting a dial tone based on the telephone number data read by said read means.

10. The face image creation device according to claim 9, wherein the designating data includes numerical data for designating the part images respectively.

11. The face image creation device according to claim 9, wherein said code data formed on said medium includes bar code data.

12. A face image creation device for creating a face image for use with a medium having bar code data printed thereon, the face image including a plurality parts selected from a plurality of part images, the selected part images of the plurality of parts being disposed at respective predetermined positions to create a face image, each part image being identified by respective designating data, the designating data being represented by bar code data, the designating data identifying part images included in a face image, the face image creation device comprising:

read means for optically reading the bar code data printed on the medium;

storage means for storing a plurality of part images for each of the plurality of parts which constitute a face image, and for storing designating data which designates the part images;

converting means for converting the bar code data read by said reading means into designating data for identifying part images included in a face image; and face image creating means for reading out from said storage means part images identified by the designating data, and for disposing the read part images at respective predetermined positions to create a face image corresponding to the bar code data read by said read means.

13. The face image creation device according to claim 12, further comprising:

outputting means for outputting the face image created by said face image creating means in one of a printed form or a display form.

14. The face image creation device according to claim 12, further comprising:

replacing means for replacing at least one of the part images of the face image created by said face image creating means with another part image stored in said storage means.

15. The face image creation device according to claim 12, further comprising:

character data inputting means for inputting character data relating to the face image created by said face image creating means; and outputting means for outputting the face image created by said face image creating means together with the character data input by said character data inputting means.

16. The face image creation device according to claim 12, wherein a plurality of code data corresponding to a plurality of face images created by said face image creating means are printed on the medium.

17. The face image creation device according to claim 12, wherein said code data includes bar code data.

18. An object image creation device for creating an object image for use with a medium having bar code data printed thereon, the object image including a plurality of parts selected from a plurality of part images, the selected part images of the plurality of parts being disposed at respective predetermined positions to create an object image, each part image being identified by respective designating data, the designating data being represented by bar code data, the designating data identifying part images included in a face image, the face image creation device comprising:

read means for optically reading the bar code data printed on the medium;

storage means for storing a plurality of part images for each of the plurality of parts which constitute an object, and for storing designating data which designates the part images, the plurality of part images respectively corresponding to numerical data;

object image creating means for reading out part images from said storage means based on the bar code data read by said read means, and for disposing the part images read from the storage means at respective predetermined positions to create an object image; and outputting means for outputting numerical data respectively corresponding to the part images which constitute the object image created by said object image creating means.

19. An object image printing medium used in an object image display device which optically reads bar code data printed on the object image printing medium, and creates and displays at least a face image on the basis of part images identified by the bar code data, said object image printing medium being a card or a book, and said object image printing medium having at least face image and bar code data corresponding to the face image printed thereon, the bar code data identifying one of part images constituting the face image, whereby the face image is reproduced and displayed on the basis of the bar code data read by said object image display device.

20. An object image printing medium for use with a face image display device having a read out device for optically reading bar code data printed on the object image printing medium, and creating and displaying an object image based on the bar code data, said object image printing medium having a plurality of face images and bar code data printed thereon at respective corresponding positions, the bar code data corresponding respectively to the face images, said object image printing medium allowing, when a bar code data is read out by the read device, a face image corresponding to the bar code data read by the read out device to be reproduced and displayed based on said bar code data.

21. A face image outputting device for use with a medium having code data, in which first and second face images are created and displayed at predetermined positions, each of the first and second face images having a plurality of part images being disposed at predetermined positions in the respective face image, the plurality of part images being identified by respective designating data, first and second sets of designating data respectively identifying part images included in the first and second face images being represented by first and second code data formed on the medium, said device comprising:

read means for reading first and second code data formed on the medium;

storage means for storing a plurality of part images and a plurality of designating data which identify the plurality of part images;

converting means for converting the first and second code data read by said read means into first and second sets of designating data;

face image creating means for reading out from said storage means part images that are identified by the designating data, and for disposing the read out part images at respective predetermined positions to create first and second face images;

a memory for storing the first and second sets of designating data converted by said converting means;

determining means for determining at least one of superiority, inferiority, and compatibility between the first and second face images created by said face image creating means based on the first and second sets of designating data stored in said memory; and determination result outputting means for outputting the result of the determination by said determining means.

22. The face image outputting device according to claim 21, further comprising:

replacing means for replacing at least one of the part images included in one of the first and second face images based on the result of the determination by said determining means with another part image.

23. The face image outputting device according to claim 21, wherein the first and second data read by said read means includes one of a bar code data and magnetic recorded data.

24. An object image creation device for creating an object image including a plurality of parts selected from a plurality of part images, the selected part images corresponding to the plurality of parts being disposed at respective predetermined positions, the object image creation device comprising:

recording medium on which an object image is printed and at least one code data is magnetically recorded, the at least one code data corresponding to designating data for identifying part images which constitute the object image;

read means for reading code data magnetically recorded on said recording medium;

storage means for storing and combining a plurality of part images for each of the parts which constitute the object image and a plurality of designating data for identifying the plurality of part images;

converting means for converting the code data into designating data, the designating data identifying part images to be used to create the object image; and object image creating means for reading from said storage means part images identified by the designating data converted by said converting means, the object image creating means also disposing the read part images at respective predetermined positions to create an object image corresponding to the object image printed on said recording medium.

25. The object image creation device according to claim 24, further comprising:

outputting means for outputting the object image created by said object image creating means.

26. The object image creation device according to claim 24, further comprising:

replacing means for replacing at least one of the part images included in the object image created by said object image creating means with another part image stored in said storage means.

27. The object image creation device according to claim 24, further comprising:

character data inputting means for inputting character data relating to the object image created by said object image creating means; and outputting means for outputting the object image created by said object image creating means together with the character data input by said character data inputting means.

28. The object image creation device according to claim 24, wherein the designating data includes numerical data which identifies the part images and titles of the part images magnetically recorded on the recording medium.

29. The object image creation device according to claim 24, wherein said recording medium includes a plurality of object images and a plurality of code data printed thereon at respective locations, the plurality of object images corresponding respectively to the plurality of code data.

30. An object image creation device for creating an object image including a plurality of parts selected from a plurality of part images, the selected part images corresponding to the plurality of parts being disposed at respective predetermined positions, the object image creation device comprising:

recording medium for magnetically recording an object image and designating data, the designating data identifying part images which constitute the object image;

read means for reading the designating data;

storage means in which a plurality of part images for each of the parts which constitute an object are stored, the plurality of part images corresponding to numerical data;

object image creating means for reading out from said storage means part images corresponding to the designating data, the object image creating means disposing the part images at respective predetermined positions to create an object image; and outputting means for outputting numerical data corresponding respectively to the part images which constitute the object image created by said object image creating means.

31. A face image creation device for creating an object image including a plurality of parts selected from a plurality part images, the selected part images corresponding to the plurality of parts disposed at respective predetermined positions, the face image creation device comprising:

recording medium for magnetically recording a face image, code data and telephone number data, the code data identifying designating data which respectively designates part images which constitute the face image, and telephone number data corresponding to the face image;

read means for reading code data and the telephone number data;

storage means for storing a plurality of part images for each of the parts which constitute a face image and plural designating data corresponding to the part images;

converting means for converting the code data into designating data for designating part images to be included in the face image;

face image creating means for reading from said storage means part images on the basis of the designating data converted by said converting means, and for disposing the part images at respective predetermined positions to create a face image substantially similar to the face image printed on said recording medium;

outputting means for outputting the face image created by said face image creating means; and dial tone outputting means for outputting a dial tone based on the telephone number data read by said read means on the basis of the read telephone number data.

32. The object image creation device according to claim 31, wherein the designating data includes numerical data.

33. An object image creation device for creating an object image for use with a medium having code data magnetically recorded thereon, the object image including a plurality of parts selected from a plurality of part images, the selected part images of the plurality of parts being disposed at respective predetermined positions to create an object image, the part images respectively corresponding to designating data, the object image creation device comprising:

read means for reading the code data;

storage means for storing designating data and a plurality of different part images for each of the plurality of parts which constitute an object, the plurality of part images and the designating data designating corresponding part images which are to be combined;

converting means for converting the code data read by said read means into one set of designating data; and object image creating means for reading out from said storage means part images identified by the designating data, the object image creating means disposing the read part images at respective predetermined positions to create an object image.

34. The object image creation device according to claim 33, further comprising:

outputting means for outputting the object image created by said object image creating means.

35. The object image creation device according to claim 33, further comprising:

replacing means for replacing at least one of the part images included in the object image created by said object image creating means with another part image stored in said storage means.

36. The object image creation device according to claim 33, wherein the plurality of designating data stored in said storage means includes numerical data; and wherein said object image creation device further comprises:

outputting means for outputting numerical data corresponding to the part images which constitute the object image created by said object image creating means.

37. The object image creation device according to claim 33, further comprising:

character data inputting means for inputting character data relating to the object image created by said object image creating means; and outputting means for outputting the character data input by said character data inputting means.

38. An object image recording medium used in an object image display device which magnetically reads a magnetically recorded data item, and creates and displays at least a face image on the basis of the data items read, said object image recording medium being a card having a face image printed thereon and a plurality of data items magnetically recorded thereon, each data item representing a respective one of the parts which constitute the face image, a face image being reproduced and displayed on the basis of the magnetically recorded data items read by said object image display device.

39. In an object image creation device having storage means for creating an object image, the object image including a plurality of parts selected from a plurality of part images, the selected part images corresponding to the plurality of parts being disposed at respective predetermined positions to create an object image, the plurality of part images respectively corresponding to designating data, a first set of designating data which designates part images included in the object image being represented by first code data, the code data and the part images being stored in the storage means, an object image creation method comprising the steps of:

reading code data stored in the storage means;

converting the code data read from the storage means into a first set of designating data;

reading part images corresponding to the designating data from the storage means; and disposing the read part images at the predetermined positions to create an object image corresponding to the read code data.

40. In an object image creation device having storage means for creating an object image, the object image including a plurality part images, the selected part images corresponding to the plurality of parts being disposed at respective predetermined positions to create an object image, the plurality of part images respectively corresponding to designating data, code data representing a first set of designating data which designate part images included in the object image, the code data, the part images and the telephone number data corresponding to object images being stored in the storage means, an object image creation method comprising the steps of:

reading data code and telephone number data stored in the storage means;

converting the read code data into a first set of designating data;

reading part images stored in storage means corresponding to the converted designating data;

disposing the part images read from the storage means at the predetermined positions to create an object image corresponding to the read code data; and outputting the created object image and a dial tone on the basis of the read telephone number data.

41. In an object image creation device having storage means for creating an object image, the object image including a plurality of parts selected from a plurality of part images, the selected part images corresponding to the plurality of parts being disposed at respective predetermined positions to create an object image, the plurality of part images respectively corresponding to designating data, code data representing a first set of designating data which designate part images included in the object image, the code data corresponding to the object image, and the code data and the part images being stored in the storage means, and object image outputting method comprising the steps of:

reading first and second code data stored in the storage means;

reading first and second sets of part images stored in the storage means based on the first and second read code data;

disposing the part images read from the storage means at predetermined positions to create first and second object images;

determining at least one of superiority, inferiority and compatibility between the first and second created object images; and outputting the result of the determination.

* * * * *